United States Patent
Speed

(10) Patent No.: US 11,161,863 B2
(45) Date of Patent: Nov. 2, 2021

(54) CHIRAL CATALYST AND METHOD FOR ASYMMETRIC REDUCTION OF AN IMINE

(71) Applicant: DALHOUSIE UNIVERSITY, Halifax (CA)

(72) Inventor: Alexander William Harrison Speed, Halifax (CA)

(73) Assignee: DALHOUSIE UNIVERSITY, Halifax (CA)

( * ) Notice: Subject to any disclaimer, the term of this patent is extended or adjusted under 35 U.S.C. 154(b) by 29 days.

(21) Appl. No.: 16/646,085

(22) PCT Filed: Sep. 6, 2018

(86) PCT No.: PCT/CA2018/051078
§ 371 (c)(1),
(2) Date: Mar. 10, 2020

(87) PCT Pub. No.: WO2019/051585
PCT Pub. Date: Mar. 21, 2019

(65) Prior Publication Data
US 2020/0255463 A1 Aug. 13, 2020

Related U.S. Application Data

(60) Provisional application No. 62/558,177, filed on Sep. 13, 2017.

(51) Int. Cl.
*C07F 9/6584* (2006.01)
*B01J 31/02* (2006.01)

(52) U.S. Cl.
CPC ....... *C07F 9/65848* (2013.01); *B01J 31/0265* (2013.01); *B01J 2231/64* (2013.01); *B01J 2531/0263* (2013.01)

(58) Field of Classification Search
CPC ............... C07F 9/65848; B01J 31/0255; B01J 31/0265; B01J 31/0235; B01J 31/0237
See application file for complete search history.

(56) References Cited

FOREIGN PATENT DOCUMENTS

WO    WO-2016040479 A1 *  3/2016  .......... C07F 9/65744

OTHER PUBLICATIONS

Forster, Zeitschrift für Naturforschung B, vol. 67, Issue 8, p. 765-773 (Year: 2012).*
Adams, Angew. Chem. Int. Ed. 2017, 56, 6268-6271 (Year: 2017).*
Adams et al., "Diazaphospholene Precatalysts for Imine and Conjugate Reductions," Angewandte Chemie International Edition, May 2017, vol. 56 (22), pp. 6268-6271.
Burck et al.,"P-Hydrogen-Substituted 1,3-Diazaphospholenes: Molecular Hydrides," Journal of the American Chemical Society, Mar. 2006, vol. 128 (12), pp. 3946-3955.
Chong., "1,3,2-Diazaphospholene-catalysed Reduction of Unsaturated Bonds," Thesis, NanYang Technological University, 2016, 196 pages, Retrieved from Internet:[URL:https://dr.ntu.edu.sg/bitstream/10356/68900/1/Thesis_CCC.pdf].
Chong et al.,"A Concerted Transfer Hydrogenolysis: 1,3,2-Diazaphospholene-Catalyzed Hydrogenation of N=N Bond with Ammonia-Borane," Angewandte Chemie International Edition, Mar. 2014, vol. 53 (13), pp. 3342-3346.
Foersi Er et al., "On the Synthesis and Addition Reactions of Chiral N-Heterocyclic Diphosphines," Zeitschrift für Maturforschung, Aug. 2012, vol. 67b (8), pp. 765-773.
Gudat., "A Very Peculiar Family of N-Heterocyclic Phosphines: Unusual Structures and Unique Reactivity of 1,3,2-Diazaphospholenes," Dalton Transactions, Jan. 2016, vol. 45 (14), pp. 5896-5907.
International Patent Application No. PCT/CA2018/051078, International Preliminary Report on Patentability dated Mar. 26, 2020.
International Patent Application No. PCT/CA2018/051078, International Search Report and Written Opinion dated Nov. 22, 2018.
Liu et al., "Mechanism, Catalysis and Predictions of 1,3,2-Diazaphospholenes: Theoretical Insight into Highly Polarized P-X Bonds," Organic Chemistry Frontiers, Apr. 2016, vol. 3 (4), pp. 423-433.

* cited by examiner

*Primary Examiner* — Robert C Boyle
(74) *Attorney, Agent, or Firm* — Borden Ladner Gervais; David Nauman

(57) ABSTRACT

The present disclosure discusses (i) a compound having a chemical formula according to Formula (I), or its enantiomer; and (ii) a compound that is reactive with a hydride to produce a compound having a chemical formula according to Formula (I), or its enantiomer. Formula (I) is: Formula (I) where $R_1$ and $R_2$ are H, optionally substituted $C_1$-$C_3$ alkyl, or linked together to form an optionally substituted $C_3$ or $C_4$ alkyl group; $R_3$ and $R_{3'}$ are H; $R_4$ and $R_{4'}$ are the same, and are optionally substituted $C_1$-$C_6$ alkyl; and $R_5$ and $R_{5'}$ are the same, and are optionally substituted aryl or heteroaryl. In some examples, R4 and R5 are linked, and $R_{4'}$ and $R_{5'}$ are linked, where both linking groups are the same. The present disclosure also discusses methods of asymmetric reduction of an imine, and methods of forming the catalysts and pre-catalysts.

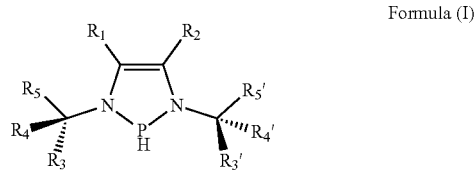

Formula (I)

20 Claims, No Drawings

CHIRAL CATALYST AND METHOD FOR ASYMMETRIC REDUCTION OF AN IMINE

CROSS-REFERENCE TO RELATED APPLICATIONS

This application claims the benefit of U.S. Provisional Application No. 62/558,177, filed Sep. 13, 2017.

FIELD

The present disclosure relates to chiral catalysts that may be used to asymmetrically reduce an imine to a chiral amine.

BACKGROUND

The following paragraphs are not an admission that anything discussed in them is prior art or part of the knowledge of persons skilled in the art.

Amine functional groups are ubiquitous in natural products and drug molecules. The reduction of imines represents a method for accessing amines, owing to the ease of preparation of imines from readily available ketones and aldehydes. Use of catalysis for the reduction of imines affords opportunities to control selectivity, especially in the reduction of substrates containing multiple reactive functional groups.

Many pharmaceutical compounds are chiral and it may be desirable to separate one enantiomer from the other. For example, one enantiomer of a compound may have a desired biological activity, while the other enantiomer may be less active, inactive, or have some undesirable property or toxicity. The racemate may have a different, and undesirable, physical property from the active enantiomer even if the other enantiomer is inactive. Pharmaceutical manufacturers may use a synthetic route that produces a racemic mixture of both enantiomers, which they then separate. Such a separation may be effected by crystallization, chromatography, or the use of enzymes. It is desirable to identify asymmetric synthetic routes that do not produce racemic mixtures, but instead selectively produce one enantiomeric product over the other.

INTRODUCTION

The following introduction is intended to introduce the reader to this specification but not to define any invention. One or more inventions may reside in a combination or sub-combination of the elements or method steps described below or in other parts of this document. The inventors do not waive or disclaim their rights to any invention or inventions disclosed in this specification merely by not describing such other invention or inventions in the claims.

Phosphorus-based catalysts have been used to reduce aldehydes and ketones. One example of such a catalyst is:

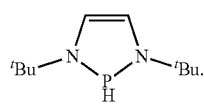

This diazaphospholene, and its P—OCH$_2$C(CH$_3$)$_3$ precatalyst, have been used to reduce imines (M. R. Adams, C.-H. Tien, B. S. N. Huchenski, M. J. Ferguson, A. W. H. Speed, *Angew. Chem. Int. Ed.* 2017, 56, 6268). The contents of this reference are incorporated herein by reference.

The authors of the present disclosure determined that it was desirable to identify diazaphospholene-related catalysts that could reduce asymmetric imines and preferentially produce one enantiomer of the chiral amine product over the other enantiomer. Such a reaction may be referred to as an "enantioselective reaction" or an "enantiomerically selective reaction".

In a catalytic reduction of an asymmetric imine using a diazaphospholene-based catalyst, a person of ordinary skill would expect that enhanced enantioselectivity would be available so long as the diazaphospholene catalyst included chiral groups attached to the nitrogen atoms, where the three substituents of the chiral groups were differentiated by size. Such a skilled person would expect enhanced enantioselectivity since the chiral groups would preferentially interact with one side of the planar imine, preferentially resulting in one chiral product over the other.

However, the authors of the present disclosure have surprisingly discovered that, in order to achieve an acceptable amount of enantioselectivity, the catalysts require one of the three substituents of the chiral group to be optionally substituted C$_1$-C$_6$ alkyl; another of the three substituents of the chiral group to be optionally substituted aryl or heteroaryl; and the last of the three substituents of the chiral group to be hydrogen. The chiral groups attached to the nitrogen atoms have the same handedness.

In one aspect, the present disclosure provides a compound: (a) having a chemical formula according to Formula (I); or (b) having a chemical formula that is the enantiomer of Formula (I):

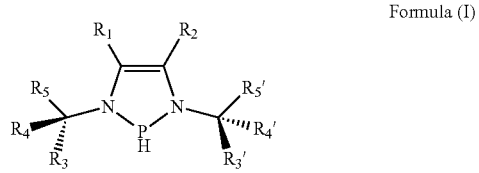

Formula (I)

In Formula (I), R$_1$ and R$_2$ are H, optionally substituted C$_1$-C$_3$ alkyl, or linked together to form an optionally substituted C$_3$ or C$_4$ alkyl group; R$_3$ and R$_3$' are H; R$_4$ and R$_4$' are the same, and are optionally substituted C$_1$-C$_6$ alkyl; and R$_5$ and R$_5$' are the same, and are optionally substituted aryl or heteroaryl. Optionally, R$_4$ and R$_5$ are linked, R$_4$' and R$_5$' are linked, and both linking groups are the same.

The optionally substituted C$_1$-C$_6$ alkyl may be linear, or may include a secondary or tertiary carbon atom.

The optionally substituted C$_1$-C$_6$ alkyl may be substituted with a silyl ether, such as trimethylsilyl ether (-OTMS), triethylsilylether (-OTES), triphenylsilyl ether, or tert-Butyldimethylsilyl ether (-OTBS); or substituted with an alkyl ether, such as a methyl ether, ethyl ether, isopropyl ether, or benzyl ether.

R$_4$ and R$_4$' may be methyl, trifluoromethyl, ethyl, propyl, isopropyl or tert-butyl, and are preferably methyl.

The optionally substituted aryl may be optionally substituted: phenyl, naphthyl, anthracene, phenanthrene, or pyrene.

The optionally substituted aryl may be naphthyl linked at the 1-position or the 2-position.

The optionally substituted aryl may be optionally substituted phenyl, with the R$^4$ and R$^{4'}$ linked to the phenyl ring.

The optionally substituted heteroaryl may be optionally substituted: quinoline, isoquinoline, benzofuran, or benzothiophene.

The optionally substituted aryl or heteroaryl may be substituted with, for example: trifluoromethyl, an ether group, an alkyl group, or a phenyl group.

It should be understood that the above definitions for the substituents of Formula (I) are equally applicable to the compounds of Formulas (II) through (V).

In some examples, $R_1$ and $R_2$ are H; $R_3$ and $R_3'$ are H; $R_4$ and $R_4'$ are methyl or trifluoromethyl; and $R_5$ and $R_5'$ are naphthyl. $R_4$ and $R_4'$ are preferably methyl. $R_5$ and $R_5'$ are preferably naphthyl linked at the 1-position. One specific example of a compound having a chemical formula according to Formula (I) is a compound having a chemical formula according to Formula (Ia):

Formula (Ia)

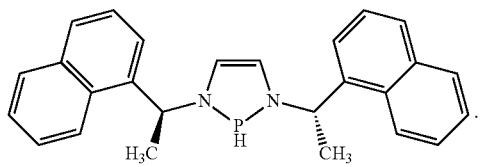

In another specific example, $R_1$ and $R_2$ are H; $R_3$ and $R_3'$ are H; $R_4$ and $R_4'$ are ethylene and are linked to $R_5$ and $R_5'$, respectively; $R_5$ and $R_5'$ are naphthyl linked at the 1-position, and the compound having a chemical formula according to Formula (I) has a chemical formula according to Formula (Ib):

Formula (Ib)

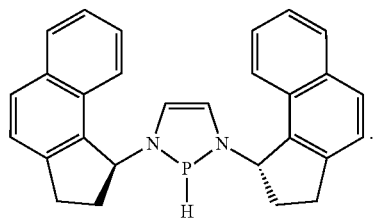

In still another specific example, $R_1$ and $R_2$ are H; $R_3$ and $R_3'$ are H; $R_4$ and $R_4'$ are ethylene and are linked to $R_5$ and $R_5'$, respectively; $R_5$ and $R_5'$ are phenyl substituted with trifluoromethyl, and the compound having a chemical formula according to Formula (I) has a chemical formula according to Formula (Ic):

Formula (Ic)

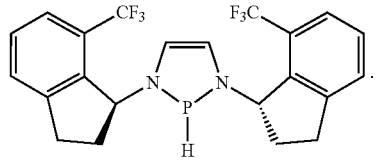

In yet another specific example, $R_1$ and $R_2$ are H; $R_3$ and $R_3'$ are H; $R_4$ and $R_4'$ are ethylene substituted with -OTBS, and are linked to $R_5$ and $R_5'$, respectively; $R_5$ and $R_5'$ are phenyl, and the compound having a chemical formula according to Formula (I) has a chemical formula according to Formula (Id):

Formula (Id)

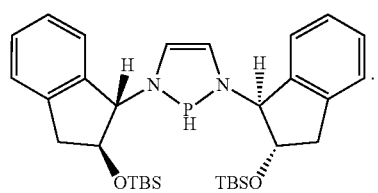

In another aspect, the present disclosure provides a compound: (c) that is reactive with a hydride to produce a compound having a chemical formula according to Formula (I); or (d) that is reactive with a hydride to produce a compound having a chemical formula that is the enantiomer of Formula (I). Such compounds may be referred to as "pre-catalysts".

In some examples, such a pre-catalyst compound has a chemical formula according to Formula (II), or has a chemical formula that is the enantiomer of Formula (II):

Formula (II)

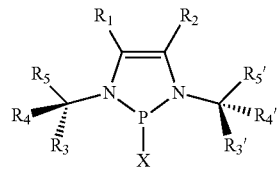

where X is halogen. X may be F, Cl, Br or I.

In particular examples, $R_1$ and $R_2$ are H; $R_3$ and $R_3'$ are H; $R_4$ and $R_4'$ are methyl, trifluoromethyl, or tert-butyl, preferably methyl; and $R_5$ and $R_5'$ are naphthyl, preferably linked at the 1-position.

Lithium aluminum hydride, sodium bis(2-methoxyethoxy)aluminumhydride, or pinacolborane may be used to transform a compound according to Formula (II), or its enantiomer, into a compound according to Formula (I), or its enantiomer. When X is Cl, Br or I, the hydride may be lithium aluminum hydride or sodium bis(2-methoxyethoxy) aluminumhydride. When X is Cl, Br, or I and an imine is present in the reaction mixture, the P—X compounds may be reduced using pinacolborane as the imine can form an adduct with the pinacolborane, allowing hydride transfer to the Cl, Br, or I. When X is F, the hydride may be lithium aluminum hydride, sodium bis(2-methoxyethoxy)aluminumhydride, or pinacolborane. Pinacolborane may be referred to as "HB(pin)" or "HBpin".

In one specific example, the compound that is reactive with a hydride has a chemical formula according to Formula (IIa), or has a chemical formula that is the enantiomer of Formula (IIa):

Formula (IIa)

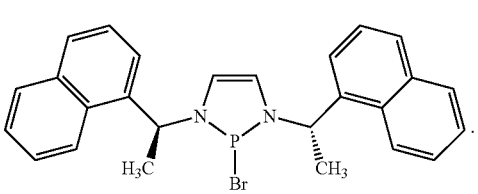

In other examples of a pre-catalyst compound, the compound has a chemical formula according to Formula (II-i), or has a chemical formula that is the enantiomer of Formula (II-i):

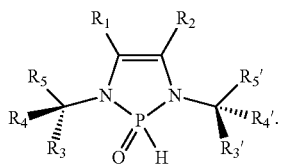

Formula (II-i)

Such secondary phosphine oxide compounds may be stable to ambient conditions.

In particular examples, $R_1$ and $R_2$ are H; $R_3$ and $R_3'$ are H; $R_4$ and $R_4'$ are methyl, trifluoromethyl, or tert-butyl, preferably methyl; and $R_5$ and $R_5'$ are naphthyl, preferably linked at the 1-position.

A compound having a chemical formula according to Formula (II-i) may be formed from the reaction of the corresponding compound according to Formula (II) where X=Br with water in the presence of a base, such as an organic solvent-soluble base, for example triethylamine. An aqueous-soluble base may be used in a biphasic reaction mixture.

In specific examples, the compound that is reactive with a hydride has a chemical formula according to Formula (II-ia), or has a chemical formula that is the enantiomer of Formula (II-ia):

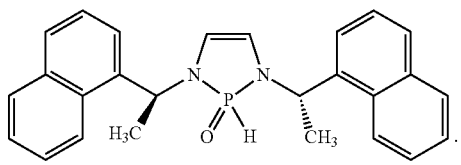

Formula (II-ia)

The compound having a chemical formula according to Formula (II-i), or having a chemical formula that is the enantiomer of Formula (II-i), may be transformed into the corresponding compound according to Formula (I), or its enantiomer, through a reaction with a hydride, such as pinacolborane, lithium aluminum hydride, sodium bis(2-methoxyethoxy)aluminumhydride, or diisobutylaluminum hydride. For example, the compound according to Formula (II-ia) may be reacted with pinacolborane to form the compound according to Formula (Ia).

In other examples of a compound that is reactive with a hydride to produce a catalyst according to the present disclosure, the compound has a chemical formula according to Formula (III), or has a chemical formula that is the enantiomer of Formula (III):

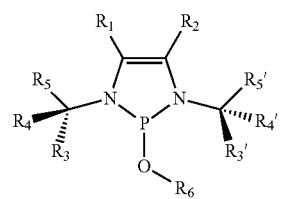

Formula (III)

where $R_6$ is: optionally substituted alkyl, aryl, or heteroaryl.

$R_6$ is preferably an optionally substituted alkyl, such as: methyl, ethyl, propyl, —$CH_2$—$C(CH_3)_3$, benzyl, or para-bromobenzyl.

In particular examples, $R_1$ and $R_2$ are H; $R_3$ and $R_3'$ are H; $R_4$ and $R_4'$ are methyl, trifluoromethyl, or tert-butyl, preferably methyl; and $R_5$ and $R_5'$ are naphthyl, preferably linked at the 1-position.

In a specific example, the compound that is reactive with a hydride has a chemical formula according to Formula (IIIa), or has a chemical formula that is the enantiomer of Formula (IIIa):

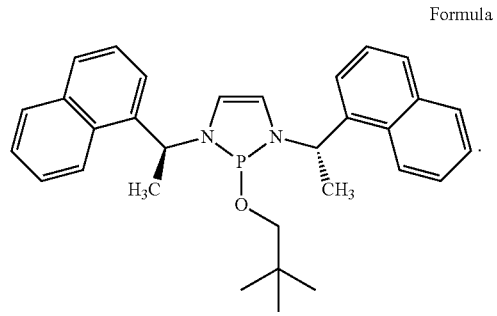

Formula (IIIa)

Pinacolborane may be used to transform a compound according to Formula (III), such as a compound according to Formula (IIIa), or its enantiomer, into a compound according to Formula (I), or its enantiomer.

In other examples of a compound that is reactive with a hydride to produce a catalyst according to the present disclosure, the compound has a chemical formula according to Formula (IV), or has a chemical formula that is the enantiomer of Formula (IV):

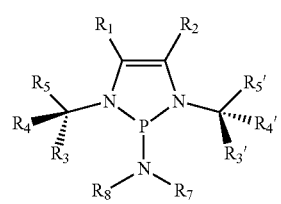

Formula (IV)

where $R_7$ and $R_8$ are, independently: optionally substituted alkyl, aryl, or heteroaryl. $R_7$ and $R_8$ may be linked.

$R_7$ and $R_8$ may each, independently, be optionally substituted alkyl, such as methyl, ethyl, propyl, benzyl, or para-bromobenzyl.

In particular examples, $R_1$ and $R_2$ are H; $R_3$ and $R_3'$ are H; $R_4$ and $R_4'$ are methyl, trifluoromethyl, or tert-butyl, preferably methyl; and $R_5$ and $R_5'$ are naphthyl, preferably linked at the 1-position.

In specific examples, the compound that is reactive with a hydride has a chemical formula according to Formula (IVa), or has a chemical formula that is the enantiomer of Formula (IVa):

Formula (IVa)

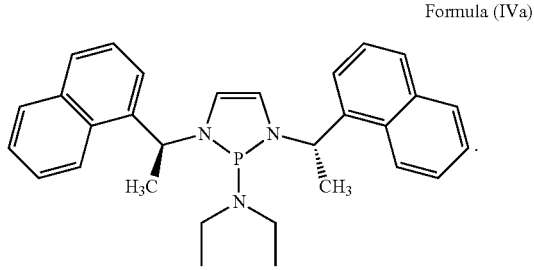 [SMILES: CCN(CC)P1N([C@@H](C)c2cccc3ccccc23)C=CN1[C@@H](C)c1cccc2ccccc12]

In other specific examples, the compound that is reactive with a hydride has a chemical formula according to Formula (IVb), or has a chemical formula that is the enantiomer of Formula (IVb):

Formula (IIIa)

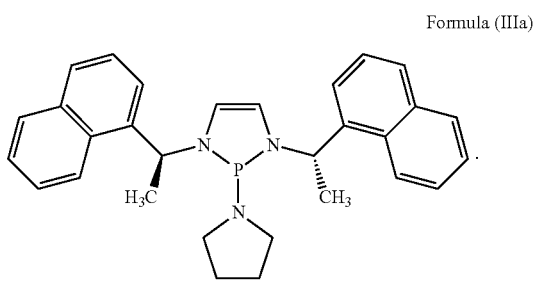 [SMILES: C[C@@H](c1cccc2ccccc12)N1C=CN([C@@H](C)c2cccc3ccccc23)P1N1CCCC1]

In another aspect, the present disclosure provides a compound: (a) having a chemical formula according to Formula (V); or (b) having a chemical formula that is the enantiomer of Formula (V):

Formula (V)

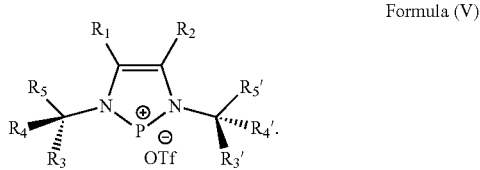

In particular examples, $R_1$ and $R_2$ are H; $R_3$ and $R_3'$ are H; $R_4$ and $R_4'$ are methyl, trifluoromethyl, or tert-butyl, preferably methyl; and $R_5$ and $R_5'$ are naphthyl, preferably linked at the 1-position. In a specific example, the compound has a chemical formula according to Formula (Va), or has a chemical formula that is the enantiomer of Formula (Va):

Formula (Va)

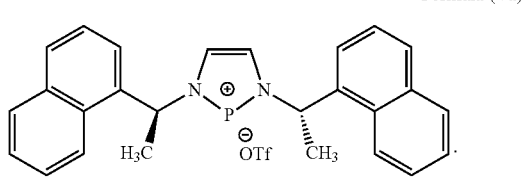

A phosphenium triflate compound having a chemical formula according to Formula (V), or the enantiomer of Formula (V), may be formed from the reaction of the corresponding compound according to Formula (II), or its enantiomer, with one equivalent of AgOTf, or with $Me_3SiOTf$. The chemical group "OTf" represents "$O-SO_2-CF_3$". The reagents may be dissolved in a non-protic, non-enolizable, and non-reactive solvent or solvents, such as in $CH_2Cl_2$ or in $CH_3CN$.

Phosphenium triflate compounds according to the present disclosure are highly reactive catalysts for the reduction of imines, and are tolerant of sulfur containing compounds. The catalytic reduction reactions may be cooled, for example to −30° C., while still reaching acceptable conversion rates, for example from 95% to 99% conversion. Cooling an enantioselective reaction may increase enantioselectivity in comparison to the same reaction at a higher temperature. Phosphenium triflate compounds according to the present disclosure may be used to increase enantioselectivity in a method of reducing an imine using a hydride. The phosphenium triflate compounds are particularly useful for reduction of cyclic imines.

In another aspect, the present disclosure provides an enantiomerically selective method of reducing an imine using a hydride. The method includes reacting a catalyst discussed above with an imine in the presence of the hydride. The method may include a step of transforming a pre-catalyst into the catalyst. The imine has a chemical formula according to Formula (VI):

Formula (VI)

where $R_{21}$ and $R_{22}$ are different, and: (i) $R_{20}$ is optionally substituted alkyl, and $R_{21}$ and $R_{22}$ are each, independently, optionally substituted alkyl, aryl, or heteroaryl; (ii) $R_{22}$ is optionally substituted alkyl, aryl, or heteroaryl, and $R_{20}$ and $R_{21}$ are linked to form an optionally substituted cyclic aminoalkyl group; or (iii) $R_{20}$ is optionally substituted alkyl, and $R_{21}$ and $R_{22}$ are linked to form an optionally substituted cyclic alkyl group.

When the compound has a chemical formula according to Formula (III), or has a chemical formula that is the enantiomer of Formula (III), such as a chemical formula according to Formula (IIIa) or its enantiomer, the hydride may be pinacolborane.

When the compound has a chemical formula according to Formula (V), or has a chemical formula that is the enantiomer of Formula (V), such as a chemical formula according to Formula (Va) or its enantiomer, the hydride may be pinacolborane, or catecholborane "HB(cat)".

In particular examples, $R_{22}$ is aryl or heteroaryl, such as pyridinyl, and $R_{20}$ and $R_{21}$ are linked to form an optionally substituted cyclic $C_4$ or $C_5$ aminoalkyl group, such as a 5-membered aminoalkyl group. In specific examples, $R_{22}$ is pyridinyl, $R_{20}$ and $R_{21}$ are linked to form a cyclic 5-membered aminoalkyl group, and the imine has a chemical formula according to Formula (VIa):

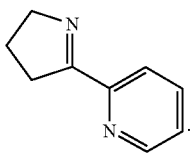

Formula (VIa)

In other particular examples, the imine has a chemical formula according to Formula (VIb):

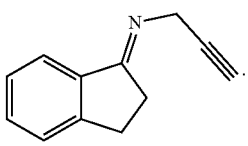

Formula (VIb)

The reaction mixture may be dissolved in an ethereal solvent, such as tetrahydrofuran, methyl tert butyl ether, cyclopentyl methyl ether, or 1,4-dioxane.

In still another aspect, the present disclosure provides a method of making a compound according to Formula (II) where X is Br, and $R_4$ and $R_4'$ are methyl. The method includes reacting a compound having a chemical formula according to Formula (VII) where $R_4$ and $R_4'$ are methyl with $PBr_3$ in the presence of a bromine scavenger, such as cyclohexene. Formula (VII) is:

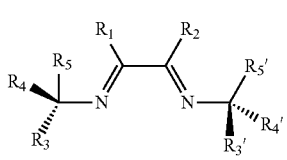

Formula (VII)

and where $R_1$, $R_2$, $R_3$, $R_3'$, $R_5$, and $R_5'$ are as defined above as appropriate to produce the compound according to Formula (II) where X is Br, and $R_4$ and $R_4'$ are methyl.

In still another aspect, the present disclosure provides a method of making a compound according to Formula (II) where X is I, and $R_4$ and $R_4'$ are methyl or tert-butyl. The method includes reacting a compound having a chemical formula according to Formula (VII) where $R_4$ and $R_4'$ are methyl or tert-butyl with $PI_3$ to form a compound having a chemical formula according to Formula (VIII) where $R_4$ and $R_4'$ are methyl or tert-butyl; and reacting the compound having a chemical formula according to Formula (VIII) where $R_4$ and $R_4'$ are methyl or tert-butyl with lithium hydride to form a compound having a chemical formula according to Formula (II) wherein X is I, and $R_4$ and $R_4'$ are methyl or tert-butyl. Formulas (VII) and (VIII) are:

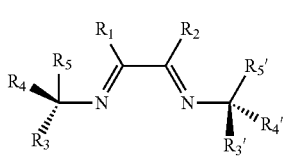

Formula (VII)

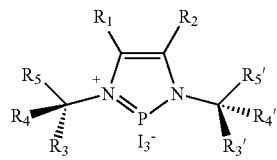

Formula (VIII)

where $R_1$, $R_2$, $R_3$, $R_3'$, $R_5$, and $R_5'$ are as defined above as appropriate to produce the compound according to Formula (II) where X is I, and $R_4$ and $R_4'$ are methyl or tert-butyl.

When X is Br or I, the method can additionally include reacting the compound with $R_6$—OH in the presence of a base, such as triethylamine, to form a compound having a chemical formula according to Formula (III), where $R_1$, $R_2$, $R_3$, $R_3'$, $R_5$, $R_5'$, and $R_6$ are as defined above as appropriate to produce the compound according to Formula (III) where $R_4$ and $R_4'$ are methyl or tert-butyl.

Alternatively, when X is Br or I, the method can additionally include reacting the compound with $R_7$—NH—$R_8$ to form a compound having a chemical formula according to Formula (IV), wherein $R_1$, $R_2$, $R_3$, $R_3'$, $R_5$, $R_5'$, $R_7$ and $R_8$ are as defined above as appropriate to produce the compound according to Formula (IV) where $R_4$ and $R_4'$ are methyl or tert-butyl.

DETAILED DESCRIPTION

Definitions

Unless otherwise defined, terms as used in the specification refer to the following definitions, as detailed below.

The term "alkyl" as used herein means a straight or branched chain hydrocarbon containing from 1 to 20 carbon atoms, preferably from 1 to 10 carbon atoms, more preferably 1, 2, 3, 4, 5, or 6 carbons. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl. The term "$C_{x-y}$ alkyl" as used herein means a straight or branched chain hydrocarbon containing from "x" to "y" carbon atoms.

The term "aryl", as used herein, refer to 5- or 6-membered aromatic rings or connected systems thereof. Representative examples of 5- to 6-membered aromatic rings include, but are not limited to, phenyl, cyclopentadienyl, naphthyl, anthracenyl, and phenanthryl.

The term "heteroaryl", as used herein, refers to an aryl group containing at least one heteroatom independently selected from nitrogen, oxygen, or sulfur; or a tautomer thereof. Such a system of rings can be monocyclic or polycyclic as further described herein. Examples of such rings include, but are not limited to, rings wherein one carbon is replaced with an O or atom; where one, two, or three N atoms are arranged in a suitable manner to provide aromaticity; or where two carbon atoms in the ring are replaced with one O or S atom and one N atom. Such rings can include, but are not limited to, a six-membered aromatic ring wherein one to four of the ring carbon atoms are replaced by nitrogen atoms, five-membered rings containing a sulfur, oxygen, or nitrogen in the ring; five membered rings containing one to four nitrogen atoms; and five membered rings containing an oxygen or sulfur and one to three nitrogen atoms.

Representative examples of 5- to 6-membered heteroaryl rings include, but are not limited to, furyl, imidazolyl, isoxazolyl, isothiazolyl, oxazolyl, pyrazinyl, pyrazolyl, pyridazinyl, pyridinyl, pyrimidinyl, pyrrolyl, tetrazolyl, [1,2,3]thiadiazolyl, [1,2,3]oxadiazolyl, thiazolyl, thienyl, [1,2,3]triazinyl, [1,2,4]triazinyl, [1,3,5]triazinyl, [1,2,3]triazolyl, and [1,2,4]triazolyl. Bicylic systems include benzofuran, benzothiazole, indolyl and azaindolyl, among many others. In certain Formulas of the disclosure, for ease of depiction aromaticity has been illustrated using alternating double bonds; in some heteroaryl groups, the most stable aromatic structure may be different and the Formulas are intended to encompass such structures also.

The term "optionally substituted" as used herein in reference to alkyl, aryl and heteroaryl groups refers to the replacement of one or more hydrogen atoms with non-hydrogen substituent(s), such as an optionally substituted alkyl, optionally substituted aryl, optionally substituted heteroaryl, optionally substituted alkoxy, optionally substituted thioalkoxy, or halogen. Each non-hydrogen substituent is independently selected, and is preferably not a functional group that is reactive with a hydride. For example, the substituent is preferably not reactive with a hydride used in a reaction to produce a compound having a chemical formula according to Formula (I). In another example, the substituent is preferably not reactive with a hydride used in a reaction with a compound having a chemical formula according to Formula (I) and an imine. A non-hydrogen substituent that is reactive with a hydride may be included if the resulting reduced functional group is a desired or acceptable chemical transformation. For example, $R_6$ is optionally substituted alkyl, aryl, or heteroaryl. Since the P—$OR_6$ bond is reduced to P—H on reaction with pinacolborane, the optional substituents on the $R_6$ group do not affect the reactivity of the P—H catalyst and therefore may include groups reactive with pinacolborane.

Aryl and heteroaryl groups may be substituted with as many or as few non-hydrogen substitutents as valence allows. Aryl and heteroaryl groups of the disclosure may be present as tautomers. Two examples of optionally substituted aryl or heteroaryl groups are: a mesityl group (i.e. a substituted phenyl group having the hydrogens at the 2, 4, and 6 positions replaced with methyl groups), and a phenyl group having one hydrogen replaced with a methyl group and another hydrogen replaced with an isopropyl group.

The term "hydrogen" or "H" (or a chemical name that inherently includes a hydrogen) as used herein refers to any isotope of hydrogen, such as hydrogen or deuterium. For example, it should be understood that reference to $R_4$ and $R_4'$ "both being methyl" also refers to $R_4$ and $R_4'$ being -$CD_3$, since "methyl" is the name for the chemical group "—$CH_3$", which includes the term "H".

The expression "are the same" in reference to two substituents in the two chiral groups attached to the nitrogen atoms should be understood to include substituents that are identical in everything other than one or more isotopes of hydrogen. For example, the expression "$R_5$ and $R_5'$ are the same, and are optionally substituted aryl or heteroaryl" should be understood to mean that $R_5$ can be —$C_6H_5$ when $R_5'$ is —$C_6D_5$. Similarly, the expression "$R_4$ and $R_4'$ are the same, and are optionally substituted $C_1$-$C_6$ alkyl" should be understood to mean that $R_4$ can be —$CH_3$ when $R_4'$ is —$CHD_2$. In another example, the expression "$R_4$ and $R_5$ are linked, $R_4'$ and $R_5'$ are linked, and both linking groups are the same" should be understood to mean that $R_4$ can be ethylene substituted with —$OCH_3$ and linked to $R_5$ when and $R_4'$ is ethylene substituted with —$OCD_3$ and is linked to $R_5'$. In combination with the term "H", discussed above, it should be further understood that reference to $R_4$ and $R_4'$ "both being methyl" means that each of $R_4$ and $R_4'$ can include different isotopes of hydrogen, for example: $R_4$ can be —$CH_3$ when $R_4'$ is —$CHD_2$; $R_4$ can be —$CD_3$ when $R_4'$ is —$CH_2D$; or $R_4$ can be —$CH_3$ when $R_4'$ is —$CD_3$.

The term "alkoxy" as used herein means an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy. The terms "alkthiolyl" and "thioalkoxy" as used herein refer to the analogous group containing sulfur rather than oxygen. Representative examples of thioalkoxy include, but are not limited to, methylthio, ethylthio, and propylthio.

The term "carbonyl" as used herein means a —C(=O)— group.

The term "carboxy" as used herein means a —COOH group, which may be protected as an ester group: —COO-alkyl.

The term "fluoro" as used herein means —F.

The term "halo" or "halogen" as used herein means Cl, Br, I, or F. The term "halide" as used herein means their corresponding radicals.

The term "hydroxy" as used herein means an —OH group.

The term "sulfonyl" as used herein means a —$SO_2$— group.

Unless otherwise indicated, the term "protecting group" or "protective group," when used to refer to part of a molecule subjected to a chemical reaction, means a chemical moiety that is not reactive under the conditions of that chemical reaction, and which may be removed to provide a moiety that is reactive under those conditions.

Protecting groups are well known in the art. See, e.g., Greene, T. W. and Wuts, P.G.M., Protective Groups in Organic Synthesis (3 rd ed., John Wiley & Sons: 1999); Larock, R. C., Comprehensive Organic Transformations (2 nd ed., John Wiley & Sons: 1999). Some examples include benzyl, diphenylmethyl, trityl, Cbz, Boc, Fmoc, methoxycarbonyl, ethoxycarbonyl, silyl, and phthalimido. Protecting groups include, for example, nitrogen protecting groups and hydroxy-protecting groups.

The use of parentheses in general chemical expressions is intended to mean that the chemical name is considered to encompass compounds with and without the noted term. For example: (hetero)aryl is intended to encompass both aryl and heteroaryl.

The term "each independently" means that a particular set of R groups, all of which share a set of possibilities, can each be arbitrarily assigned to have a different possibility or the same possibility, and that this independence of assignment extends to the type of functionality selected. For example, "$R_x$ and $R_y$ are each independently H or alkyl" means not only that both $R_x$ and $R_y$ can each be alkyl, but each can be different groups from the noted list. For example: $R_x$ and $R_y$ can both be methyl; or $R_x$ can be methyl and $R_y$ can be ethyl; or $R_x$ can be H and $R_y$ can be methyl.

The term "substantially pure" means that the isolated material is at least 90% pure, preferably 95% pure, even more preferably 99% pure as assayed by analytical techniques known in the art.

It should be noted that a chemical moiety that forms part of a larger compound may be described herein using a name commonly accorded it when it exists as a single molecule or a name commonly accorded its radical. For example, the terms "pyridine" and "pyridyl" are accorded the same meaning when used to describe a moiety attached to other chemical moieties. Thus, for example, the two phrases "XOH, wherein X is pyridyl" and "XOH, wherein X is pyridine" are accorded the same meaning, and encompass the compounds pyridin-2-ol, pyridin-3-ol and pyridin-4-ol.

It should be noted that, although the present disclosure may explicitly distinguish between (i) a compound having a chemical formula and (ii) a compound having the enantiomer of the chemical formula, identification of one enantiomer is intended to include reference to both enantiomers—unless it is clear from the context that only a single enantiomer is intended to be identified. For example, reference to: a compound "that has a chemical formula according to Formula [x]", a compound "according to the present disclosure", a compound "according to either enantiomer", or a "specific example" or "specific examples" of a compound, is intended to encompass both enantiomers of the identified compound.

Discussion

In one aspect, the present disclosure provides: a compound that has a chemical formula according to Formula (I), or the enantiomer of Formula (I). A compound according to either enantiomer may be used as a catalyst in an enantioselective reaction with an asymmetric imine. Such a compound may be referred to herein as a "catalyst according to the present disclosure". In the context of the present disclosure, an "asymmetric imine" refers to an imine with two different, non-hydrogen substituents on the imine carbon, and reduction with a hydride results in a product with a chiral carbon.

Enhanced enantioselectivity refers to the production of a mixture of chiral products where one enantiomer is preferentially produced over the other enantiomer. Using a catalyst of one enantiomer of Formula (I) preferentially produces one chiral product over its enantiomer, and using a catalyst of the other enantiomer of Formula (I) preferentially produces the other chiral product.

The ratio between the two produced enantiomers is referred to as the "enantiomeric ratio" ("er"), and may be used to calculate the enantiomeric excess ("ee"). In the context of the present disclosure, an "acceptable amount of enantioselectivity" refers to an ee of greater than 20 (corresponding to an er of greater than 60:40). It should be understood that enantioselectivity is dependent on the catalyst, the imine substrate, and the reaction conditions (such as the solvent and/or temperature). Accordingly, a catalyst according to the present disclosure may generate a product mixture with an ee of greater than 20 in one reaction, while generating a product mixture with an ee of less than 20 in a different reaction (such as with a different substrate and/or under different reaction conditions).

In some exemplary reactions, an imine reduction using a catalyst according to the present disclosure may result in an er of about 70:30 (corresponding to an ee of about 40). In yet other exemplary reactions, the er may be about 80:20 (corresponding to an ee of about 60). In particular exemplary reactions, the er may be about 85:15 (corresponding to an ee of about 70). Although an ee of greater than 0 demonstrates preferential production of one enantiomer over the other, it is desirable to use a catalyst and reaction conditions that result in the ee to be as high as possible. In some situations, such as if the amine product is easily crystallized with a chiral acid, it may be economically acceptable to use a catalyst and reaction conditions that result in an ee of about 40 or greater, since the product can be further resolved using the chiral acid. For other situations, such as if the substrate forms enantioenriched crystals when the starting mixture is sufficiently enantioenriched, it may be beneficial to use a catalyst and reaction conditions that result in an ee of about 60 or about 70, or greater. Such principles are reviewed, for example, in "Enantioenrichment by Crystallization" Organic Process Research & Development 2008, 12, 282-290.

Scheme 1, below, illustrates exemplary catalytic reductions of an asymmetric imine with pinacolborane in the presence of one specific enantiomer of various exemplary compounds according to Formula (III). The compounds according to Formula (III) are transformed into their respective P—H compounds on reaction with the pinacolborane. One enantiomer of the amine product corresponds to the pharmaceutical Rasagiline.

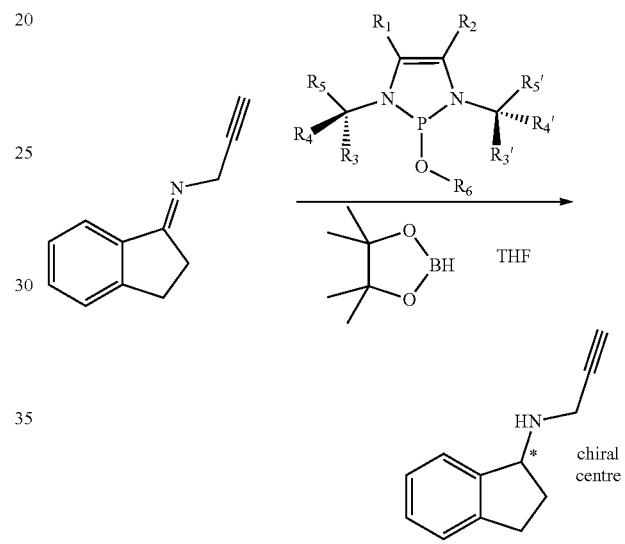

The results of the reduction are shown in Table 1.

TABLE 1

| Comp. # | $R_1$, $R_2$, $R_3$, $R_3'$ | $R_4$, $R_4'$ | $R_5$, $R_5'$ | $R_6$ | er | ee |
|---|---|---|---|---|---|---|
| 1 | H | methyl | 1-naphthyl | —$CH_2C(CH_3)_3$ | 85:15 | 70 |
| 2 | H | t-butyl | 1-naphthyl | —$CH_2C(CH_3)_3$ | 72:28 | 44 |
| 3 | H | methyl | phenyl | —$CH_2C_6H_5$ | 72:28 | 44 |
| 4 | H | ethyl | 1-napthyl | —$CH_2C(CH_3)_3$ | 71:29 | 42 |
| 5 | H | methyl | 2-naphthyl | —$CH_2C(CH_3)_3$ | 65:35 | 30 |
| 6 | H | methyl | 4-methoxy-phenyl | —$CH_2C(CH_3)_3$ | 62:38 | 24 |
| 7 | H | methyl | t-butyl | —$CH_2C(CH_3)_3$ | 60:40 | 20 |

Compound 1 corresponds to one specific enantiomer of the compound according to Formula (IIIa), and is transformed into one specific enantiomer of the compound according to Formula (Ia) on reaction with the pinacolborane. As evidenced from the results shown in Table 1, an acceptable amount of enantioselectivity is achieved when: $R_4$ and $R_4'$ are $C_1$-$C_6$ alkyl, such as methyl, ethyl, or tertiary butyl; and $R_5$ and $R_5'$ are optionally substituted aryl or heteroaryl, such as 1-naphthyl, 2-naphthyl, phenyl, or 4-methoxy-phenyl. However, the results in Table 1 demonstrate that replacement of the $R_5$/$R_5'$ aryl or heteroaryl with an alkyl group (even a t-butyl group, which is substantially larger than the $R_4$/$R_4'$ methyl group making up the second substituent on the chiral carbons of Compound 7) does not result in an acceptable amount of enantioselectivity.

The results of Table 1 suggest that, at least for this particular imine substrate: selecting methyl in the $R_4/R_4'$ position over larger alkyl groups (such methyl, ethyl, or t-butyl); and selecting 1-naphthyl in the $R_5/R_5'$ position over smaller aryl groups (such as phenyl or 4-methoxy-phenyl) and over naphthyl groups linked at other positions (such as 2-naphthyl), results in a reaction with a larger ee.

Since the P—$OR_6$ bond in the pre-catalyst is reduced to a P—H bond on reaction with the pinacolborane, —$R_6$ does not affect the enantioselectivity of the P—H catalyst.

In particular examples of the compound according to Formula (I), $R_1$ and $R_2$ are H; $R_3$ and $R_3'$ are H; $R_4$ and $R_4'$ are methyl or trifluoromethyl; and $R_5$ and $R_5'$ are naphthyl, preferably linked at the 1-position. One particular example is a compound according to Formula (Ia), which corresponds to the catalyst produced by reduction of the pre-catalyst Compound 1:

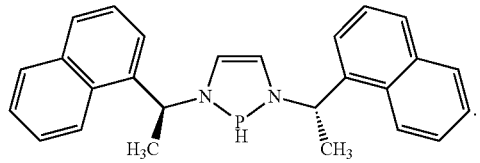

Formula (Ia)

In other particular examples of the compound according to Formula (I), $R_1$ and $R_2$ are H; $R_3$ and $R_3'$ are H; $R_4$ and $R_4'$ are ethylene and are linked to $R_5$ and $R_5'$, respectively; $R_5$ and $R_5'$ are naphthyl linked at the 1-position. One particular example is a compound according to Formula (Ib):

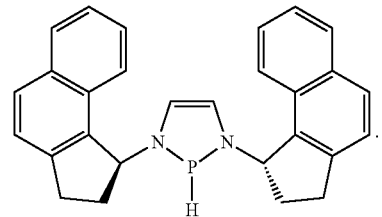

Formula (Ib)

Without wishing to be bound by theory, the authors of the present disclosure believe that the compound of Formula (Ib) is more conformationally restricted than the compound of Formula (Ia), which reduces the number of possible approaches of a substrate to the P—H bond.

In still another specific example, $R_1$ and $R_2$ are H; $R_3$ and $R_3'$ are H; $R_4$ and $R_4'$ are ethylene and are linked to $R_5$ and $R_5'$, respectively; $R_5$ and $R_5'$ are phenyl substituted with trifluoromethyl, and the compound having a chemical formula according to Formula (I) has a chemical formula according to Formula (Ic):

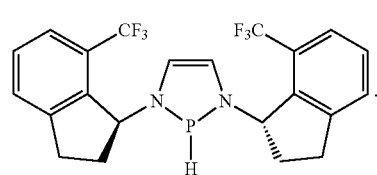

Formula (Ic)

In yet another specific example, $R_1$ and $R_2$ are H; $R_3$ and $R_3'$ are H; $R_4$ and $R_4'$ are ethylene substituted with -OTBS, and are linked to $R_5$ and $R_5'$, respectively; $R_5$ and $R_5'$ are phenyl, and the compound having a chemical formula according to Formula (I) has a chemical formula according to Formula (Id):

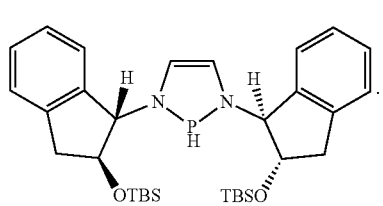

Formula (Id)

The present disclosure also provides a compound that is reactive with a hydride to produce a catalyst according to the present disclosure. Such compounds may be referred to as "pre-catalytic compounds" or "pre-catalysts". Exemplary pre-catalytic compounds have a P-halide, P—OR or P—$NR_2$ bond, which is reduced to form the P—H bond of the catalyst. Pre-catalytic compounds having a P—OR bond are briefly stable to ambient atmosphere and elevated temperatures and do not require special handling or storage conditions, such as storage under low temperatures. Pre-catalytic compounds having a P-halide bond require one less synthetic step to make. Pre-catalytic compounds having a P—$NR_2$ bond react with pinacolborane faster than the corresponding pre-catalytic P—OR compounds.

A pre-catalytic compound may be mixed with a hydride to produce the catalyst, which may be used in the reduction of the imine without further purification. The hydride used for the reduction of the pre-catalytic compound may be the same as the hydride used in the reduction of the imine, and the production of the catalyst may be effected in situ. For some pre-catalysts, pinacolborane is one example of a hydride that may be used in both reactions. Accordingly, using a pre-catalyst that can be transformed to the catalyst using pinacolborane reduces the required number of synthetic steps in comparison to using a pre-catalyst that is reduced with one hydride and an imine that is reduced with a different hydride. Some pre-catalyst may not be reactive with pinacolborane. Accordingly, if it is desirable to prepare a pre-catalyst that avoids additional synthetic steps, such as transforming P—Br to P—OR or P—$NR_2$, the imine reduction can be performed using a hydride reductant (such as lithium aluminum hydride or sodium bis(2-methoxyethoxy)

aluminumhydride) to first transform the pre-catalyst into the P—H catalyst, and then using a different hydride reductant (such as pinacolborane) to reduce the imine. For the catalytic reduction of the imine, it is desirable to use a reductant that exhibits a slow non-catalyzed reaction (such as pinacolborane). Using a reductant with a fast non-catalyzed reaction (such as aluminate reducing agents) reduces the enantioselectivity of the reaction. It is desirable to use a reductant that has a catalyzed imine reduction that is at least 5 times faster, and preferably at least 10 times faster, than the uncatalyzed imine reduction. A reaction that is 10 times faster than another reaction would be understood to have a reaction constant that is 10 times greater.

One specific example of a pre-catalytic compound according to the present disclosure is a compound according to Formula (IIa):

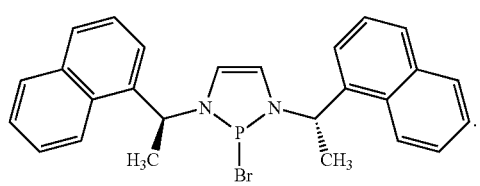

Formula (IIa)

This pre-catalyst may be transformed into the catalyst according to Formula (Ia) on treatment with lithium aluminum hydride or sodium bis(2-methoxyethoxy)aluminumhydride.

One specific example of a pre-catalyst compound according to the present disclosure is a compound according to Formula (II-ia):

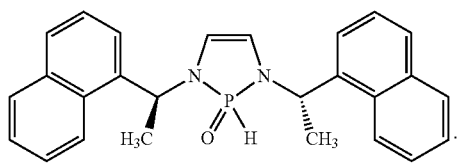

Formula (II-ia)

This pre-catalyst may be transformed into the catalyst according to Formula (Ia) on treatment with a hydride, such as pinacolborane.

Another specific example of a pre-catalytic compound according to the present disclosure is a compound according to Formula (IIIa):

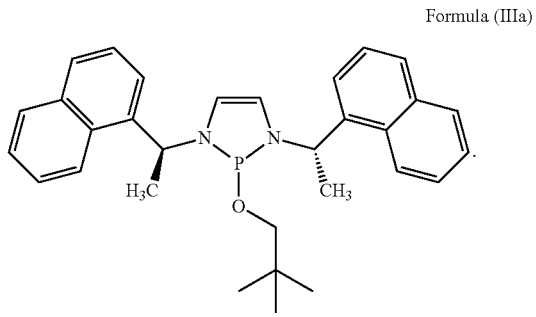 [SMILES: C[C@@H](c1cccc2ccccc12)N1C=CN([C@@H](C)c2cccc3ccccc23)P1OCC(C)(C)C]

Formula (IIIa)

This pre-catalyst may be transformed into the catalyst according to Formula (Ia) on treatment with pinacolborane.

Two other specific examples of pre-catalytic compounds according to the present disclosure are compounds according to Formulas (IVa) and (IVb):

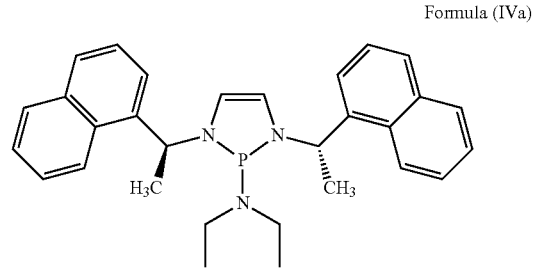

Formula (IVa)

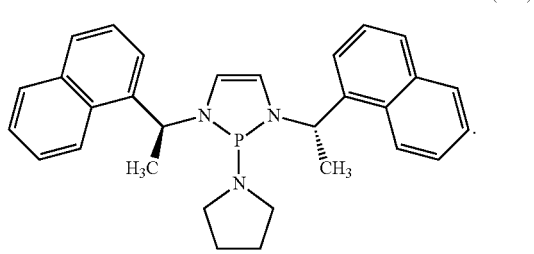

Formula (IVb)

These pre-catalysts may be transformed into the catalyst according to Formula (Ia) on treatment with pinacolborane.

The present disclosure also provides an enantiomerically selective method of reducing an imine using a hydride. The method includes reacting a catalyst discussed above with an imine in the presence of the hydride. The method may additionally include a step of transforming a pre-catalyst into the catalyst.

The imine has a chemical formula according to Formula (VI):

Formula (VI)

where $R_{20}$, $R_{21}$ and $R_{22}$ are as defined above.

In particular examples, $R_{22}$ is aryl or heteroaryl, such as pyridinyl, and $R_{20}$ and $R_{21}$ are linked to form an optionally substituted cyclic $C_4$ or $C_5$ aminoalkyl group, such as a 5-membered aminoalkyl group. In specific examples, the imine has a chemical formula according to Formula (VIa):

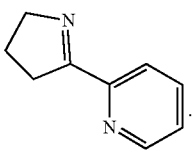

Formula (VIa)

In other particular examples, the imine has a chemical formula according to Formula (VIb):

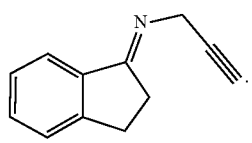

Formula (VIb)

Reduction of the imine according to Formula (VIb) results in the production of rasagiline, an irreversible inhibitor of monoamine oxidase-B. Selecting the appropriate enantiomer of the catalyst results in the enantioselective production of rasagiline over its less active enantiomer.

With some imine substrates and catalysts, it may be beneficial to perform the reduction of the imine in a particular solvent. Scheme 2 illustrates an exemplary reduction, in different solvents, of the imine of Formula (VIb) using pinacolborane and one specific enantiomer of a pre-catalyst according to Formula (IIIa).

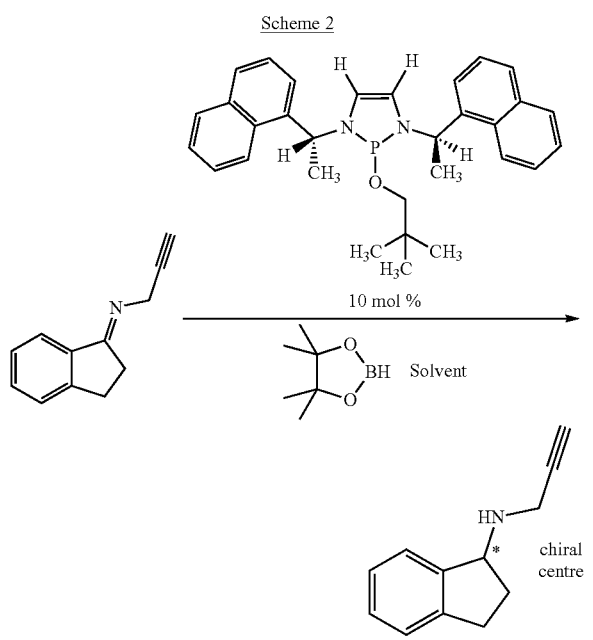

Scheme 2

Table 2 shows the results, where "nd" means "not determined".

TABLE 2

| Solvent | er | ee | Conversion (NMR) |
|---|---|---|---|
| Tetrahydrofuran (THF) | 85:15 | 70 | >99 |
| THF −35° C. | 83:17 | 66 | >99 |

TABLE 2-continued

| Solvent | er | ee | Conversion (NMR) |
|---|---|---|---|
| Cyclopentyl methyl ether (CPME) | 80:20 | 60 | >99 |
| 1,4-Dioxane | 80:20 | 60 | >99 |
| Toluene | 76:24 | 52 | >99 |
| Methyl tert butyl ether (MTBE) | 73:27 | 46 | >99 |
| Dichloromethane (DCM) | 73:27 | 46 | 63 |
| $CH_3CN$ (acetonitrile) | 62:38 | 24 | >99 |
| EtOAc (ethyl acetate) | 55:45 | 10 | 67 |
| Pentane | 50:50 | 0 | >99 |
| Isopropanol | nd | | 38 |
| α,α,α-trifluorotoluene (TFT) | nd | | 40 |

Without wishing to be bound by theory, the authors of the present disclosure expect that the solvent effects illustrated in Table 2 would be similar in reactions with other substrates and/or other catalyst since the transition states across different substrates and/or catalyst should be similar. For example, while the authors of the present disclosure do not predict that reactions in THF will always be more enantioselective than reactions in CPME, the authors of the present disclosure do expect that a reaction in THF, CPME, 1,4-dioxane, or toluene will be more enantioselective than a reaction in pentane or ethyl acetate.

In some reactions, it may be beneficial to reduce an imine where the functional group attached to the nitrogen is an optionally substituted alkyl group, such as a benzyl group, a substituted benzyl group, or —$CH_2$—CH. In some reactions, it may be beneficial to reduce an imine where one of the functional groups attached to the imine carbon is an optionally substituted aryl or heteroaryl group. Electron donating substituents on the aryl or heteroaryl group, such as —OMe and —Cl, may increase the enantioselectivity of the reduction.

Scheme 3 illustrates an exemplary reduction of different imines using pinacolborane and one specific enantiomer of a pre-catalyst according to Formula (IIIa).

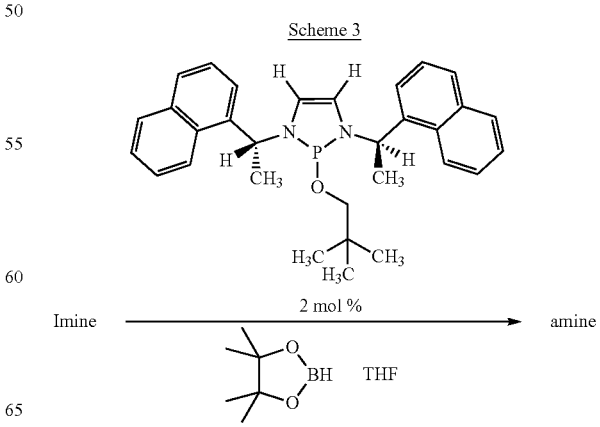

Scheme 3

Table 3 shows the results.

TABLE 3

| Compound No. | Chiral amine product (stereochemistry not shown) | er | ee | yield |
|---|---|---|---|---|
| 1 | 4-methoxyphenyl-CH(CH₃)-NH-CH₂-phenyl | 87:13 | 74 | 77% |
| 2 | 4-methoxyphenyl-CH(CH₃)-NH-CH₂-(4-methoxyphenyl) | 88:12 | 76 | 87% |
| 3 | phenyl-CH(CH₃)-NH-CH₂CH₂-CH(phenyl)₂ | 86:14 | 72 | 95% |
| 4 | phenyl-CH(CH₃)-NH-CH₂-(4-methoxyphenyl) | 85:15 | 70 | 90% |
| 5 | indan-1-yl-NH-CH₂-C≡CH | 84:16 | 68 | 84% |
| 6 | (naphthalen-2-yl)-CH(CH₃)-NH-CH₂-phenyl | 84:16 | 68 | 68% |
| 7 | (4-methoxyphenyl)-CH(CH₃)-NH-CH₂-C≡CH | 84:16 | 68 | 84% |

TABLE 3-continued
| Compound No. | Chiral amine product (stereochemistry not shown) | er | ee | yield |
|---|---|---|---|---|
| 8 | 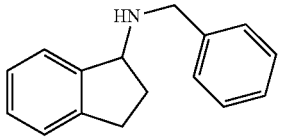 [SMILES: c1ccc(CNC2CCc3ccccc32)cc1] | 83:17 | 66 | 75% |
| 9 | 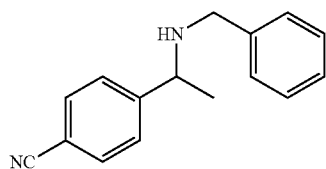 [SMILES: CC(NCc1ccccc1)c1ccc(C#N)cc1] | 81:19 | 62 | 68% |
| 10 | 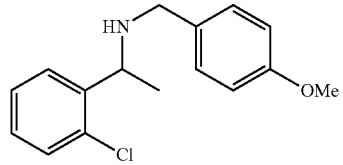 [SMILES: COc1ccc(CNC(C)c2ccccc2Cl)cc1] | 80:20 | 60 | 70% |
| 11 | 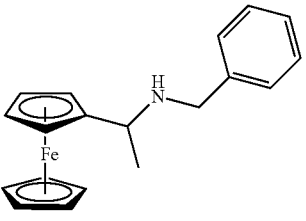 | 75:25 | 50 | 70% |
| 12 | 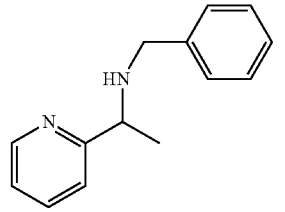 [SMILES: CC(NCc1ccccc1)c1ccccn1] | 73:27 | 46 | 86% |
| 13 | 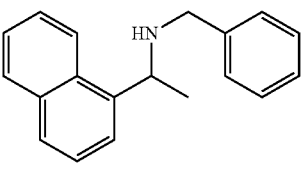 [SMILES: CC(NCc1ccccc1)c1cccc2ccccc12] | 73:27 | 46 | 72% |

TABLE 3-continued

| Compound No. | Chiral amine product (stereochemistry not shown) | er | ee | yield |
|---|---|---|---|---|
| 14 | 4-cyanophenyl-CH(CH₃)-NH-CH₂-C≡CH | 71:29 | 42 | 89% |
| 15 | 2-furyl-CH(CH₃)-NH-CH₂-phenyl | 69:31 | 38 | 79% |
| 16 | 4-methoxyphenyl-CH(CH₃)-NH-cyclopropyl | 69:31 | 38 | 83% |
| 17 | 4-methoxyphenyl-CH(CH₃)-NH-cyclohexyl | 67:33 | 34 | 83% |
| 18 | phenyl-CH(iPr)-NH-CH₂-phenyl | 55:45 | 10 | 56% |

Table 1

Although the reaction to form compound 18 does not result in an acceptable amount of enantioselectivity (i.e. an ee of more than 20), the catalyst generated from the reduction of the pre-catalyst according to Formula (IIIa) would still be considered a catalyst according to the present disclosure since other reactions do result in an acceptable amount of enatioselectivity.

In still another aspect, the present disclosure provides a method of making a pre-catalyst according to the present disclosure. The method may include the synthesis of a compound according to Formula (VII):

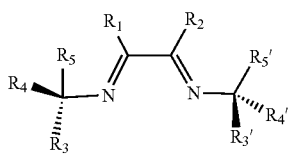

Formula (VII)

where $R_1$, $R_2$, $R_3$, $R_3'$, $R_5$, and $R_5'$ are as defined above and $R_4$ are $R_4'$ are methyl or tert-butyl. A compound according to Formula (VII) may be formed by the reaction between a dicarbonyl compound and a primary amine, as illustrated in Scheme 4.

Scheme 4

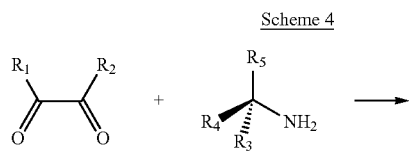

In one particular example of the method, the compound according to Formula (II) where X is Br and $R_4$ and $R_4'$ are methyl may be formed by reacting a compound having a chemical formula according to Formula (VII) where $R_4$ and $R_4'$ are methyl with $PBr_3$ in the presence of a bromine scavenger, such as cyclohexene.

In another particular example of the method, the compound according to Formula (II) where X is I may be formed by reacting a compound having a chemical formula according to Formula (VII) with $PI_3$ to form a compound having a chemical formula according to Formula (VIII); and reacting the compound having a chemical formula according to Formula (VIII) with lithium hydride. Formula (VIII) is:

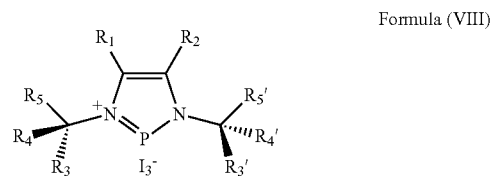

Formula (VIII)

where $R_1$, $R_2$, $R_3$, $R_3'$, $R_5$, and $R_5'$ are as defined above and $R_4$ and $R_4'$ are methyl or tert-butyl.

When X is Br or I, the method can additionally include reacting the compound with $R_6$—OH in the presence of a base, such as triethylamine, to form a compound having a chemical formula according to Formula (III). Alternatively, when X is Br or I, the method can additionally include reacting the compound with $R_7$—NH—$R_8$ to form a compound having a chemical formula according to Formula (IV).

With some imine substrates and catalysts, it may be beneficial to perform the reduction of the imine in a particular solvent. Scheme 5 illustrates an exemplary reduction, in different solvents and at either room temperature or −30° C., of 5-naphthalen-2-yl-3,4-dihydro-2H-pyrrole using pinacolborane and one specific enantiomer of a catalyst according to Formula (Va).

Scheme 5

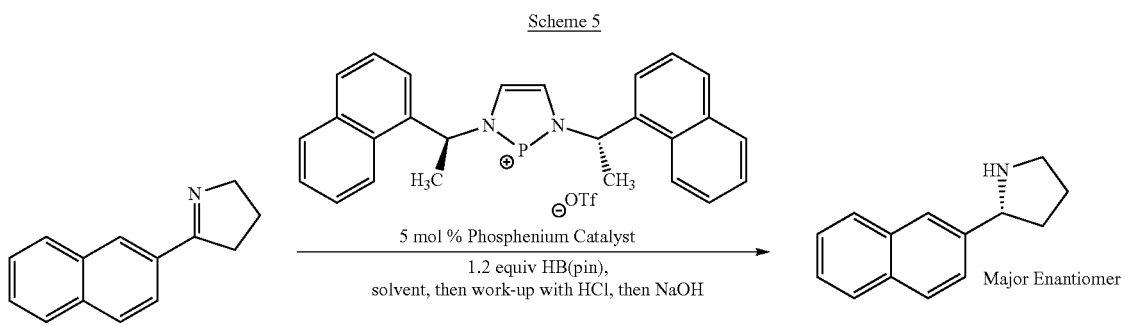

Table 4 shows the results.

TABLE 4

| Solvent | er | ee | Conversion (NMR) |
|---|---|---|---|
| THF at −30° C. | 95:5 | 90 | >99 |
| Tetrahydrofuran (THF) at r.t | 86:14 | 72 | >99 |
| Dichloromethane at −30° C. | 86:14 | 72 | >99 |
| Diethylether at r.t | 86:14 | 72 | >99 |
| Toluene at r.t | 83:17 | 66 | >99 |
| Dichloromethane (DCM) at r.t | 81:19 | 62 | >99 |
| α,α,α-trifluorotoluene (TFT) at r.t | 81:19 | 62 | >99 |
| Pentane at r.t | 78:22 | 56 | Approx.. 50 |
| $CH_3CN$ (acetonitrile) at r.t | 72:28 | 44 | >99 |

-continued

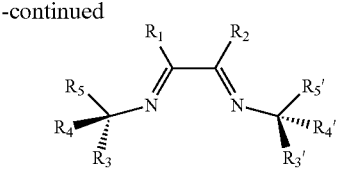

In comparison, the equivalent reduction reactions of 5-naphthalen-2-yl-3,4-dihydro-2H-pyrrole using pinacolborane and the pre-catalysts according to Formula (IIa) and (IIIa) provided the results shown in Table 5:

TABLE 5

| Reaction | er | ee | Conversion (NMR) |
|---|---|---|---|
| Compound of Formula (IIa), THF, r.t. | 84:16 | 68 | >99 |
| Compound of Formula (IIIa), CH$_3$CN, r.t. | 75:25 | 50 | >99 |
| Compound of Formula (IIIa), THF, r.t. | 87:13 | 74 | >99 |
| Compound of Formula (IIIa), THF, −30° C. | n.d. | | <20 |

Scheme 6 illustrates an exemplary reduction of different imines using pinacolborane and one specific enantiomer of a catalyst according to Formula (Va). Unless otherwise indicated in Table 6, the exemplary reactions were performed at −30° C. in THF, with 1.2 equivalents of pinacolborane, and 5 mol % of the catalyst.

Scheme 6

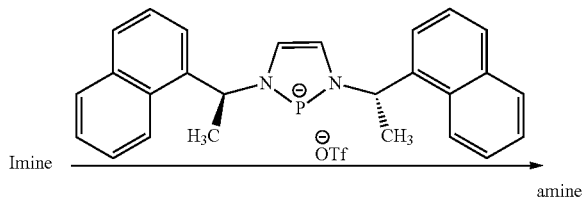

Table 6 shows the results of the exemplary reductions:

TABLE 6

| Compound No. | Chiral amine product (stereochemistry not shown) | er | ee | yield | Notes |
|---|---|---|---|---|---|
| 19 | | 89:11 | 78 | >99 | |
| 20 | | 96:4 | 92 | >99 | |
| 21 | | 93:7 | 86 | >99 | |
| 22 | | 70:30 | 40 | >99 | |
| | | 87:13 | 74 | >99 | using HB(cat) |

TABLE 6-continued
| Compound No. | Chiral amine product (stereochemistry not shown) | er | ee | yield | Notes |
|---|---|---|---|---|---|
| 23 | 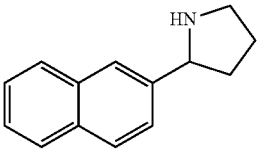 [SMILES: c1ccc2cc(C3CCCN3)ccc2c1] | 95:5 | 90 | >99 | |
| | 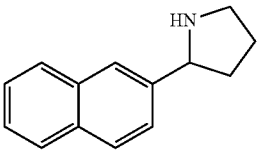 [SMILES: c1ccc2cc(C3CCCN3)ccc2c1] | 95:5 | 90 | >99 | using 0.5 mol % catalyst with 1.2 equiv. HB(pin) |
| | 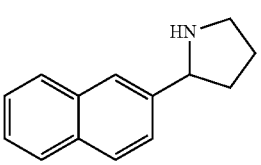 [SMILES: c1ccc2cc(C3CCCN3)ccc2c1] | 89:11 | 78 | >99 | using HB(cat) |
| 24 | 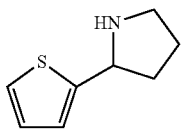 | 86:14 | 72 | >99 | |
| 25 | 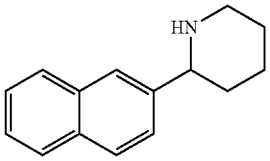 [SMILES: c1ccc2cc(C3CCCCN3)ccc2c1] | 93:7 | 86 | >99 | |
| 26 | 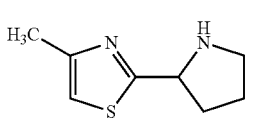 | 82:18 | 64 | >99 | |
| 27 | 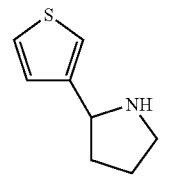 | 88:12 | 66 | >99 | |
| 12 | 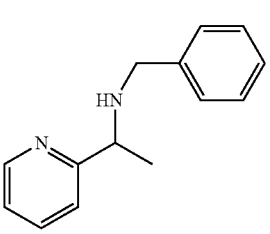 [SMILES: CC(NCc1ccccc1)c1ccccn1] | 72:28 | 44 | >99 | |
| 5 | 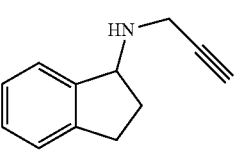 | 78:22 | 56 | >99 | |

EXPERIMENTAL

Representative procedures for preparing various pre-catalysts according to the present disclosure The following is representative of procedures for preparing exemplary pre-catalysts according to Formulas (II), (III), (IV), (V) and (VIII). Using other chiral amines will generate different diimines, and therefore pre-catalysts with different chiral groups.

N,N-bis[(R)-1-naphthyl-ethyl]ethanediimine (R)-(+)-1-naphthylethylamine (25.0 g, 146 mmol, 2 equiv.) was dissolved in 300 mL dichloromethane in a 1 L round bottom flask. Aqueous glyoxal 40 wt. % in water, (8.4 mL, 73 mmol, 1 equiv) was added, followed by anhydrous sodium sulfate (41 g, 290 mmol, 4 equiv). Six drops of formic acid were added, and the yellow mixture was allowed to stir for 18 hours. The resulting brown mixture was filtered and concentrated to give an amber oil, which was dissolved in 30 mL diethyl ether and concentrated to give a brown solid. This solid was crystalized by dissolving in 200 mL hot absolute ethanol and allowing to cool at 0° C. After 4 hours, this was filtered to give 17.3 g of the title diimine as a pale tan powder. Concentration of the mother liquor and repeating the crystallization process with 100 mL absolute ethanol gave a further 5.1 g of tan crystals (22.4 g, 84% yield).

$^1$H NMR (500 MHz, CDCl$_3$): δ 8.16 (s, 2H), 8.12 (d, J=8.8 Hz, 2H), 7.87 (d, J=8.4 Hz, 2H), 7.77 (d, J=8.0 Hz, 2H), 7.66 (d, J=6.2 Hz, 2H), 7.54-7.50 (m, 2H), 7.48-7.44 (m, 4H), 5.39 (q, J=6.6 Hz, 2H), 1.73 (d, J=6.8 Hz, 6H).

2-Bromo-1,3-di[(R)-1-naphthylethyl]2,3-dihydro-1H-1,3,2-diazaphosphole (the Precatalyst of Formula (IIa))

All operations in this procedure were conducted under an atmosphere of dry nitrogen. N,N-bis[(R)-1-naphthyl-ethyl]ethanediimine (14.0 g, 38.4 mmol, 1 equiv) was dissolved in 80 mL anhydrous dichloromethane in a 500 mL Schlenk tube equipped with a septum, stirbar, and sidearm. A positive pressure of nitrogen was attached to the sidearm. Cyclohexene (11.6 mL, 115 mmol, 3 equiv) was added, followed by dropwise addition of phosphorus tribromide (3.61 mL, 38.4 mmol, 1 equiv). The solution immediately darkened. The resulting solution was stirred at ambient temperature for 20 hours, then the solvent was removed in vacuo. The following operations are conducted in a glove box: The residue was triturated with 50 mL dry diethyl ether, and the resulting brown powder was collected on a frit by suction filtration. The powder was washed with diethyl ether (2×50 mL) followed by a minimal amount of cold acetonitrile (3×10 mL). The resulting ivory powder is dried in vacuo to yield 7.8 g of the title compound (16.4 mmol, 43% yield). $^1$H NMR shows equivalence of the naphthylethyl groups.

$^1$H NMR (300 MHz, CDCl$_3$): δ 8.05-7.99 (m, 2H), 7.94-7.89 (m, 2H), 7.85 (d, J=9.0 Hz, 2H), 7.68 (d, J=7.2 Hz, 2H), 7.57-7.48 (m, 6H), 6.71 (s, 2H), 6.05 (dq, J=9.8, 7.0 Hz, 2H), 2.20 (dd, J=6.7, 1.5 Hz, 6H).

$^{13}$C NMR (125 MHz, CDCl$_3$): δ 135.8 (d), 134.0, 130.5, 129.5, 129.3, 127.0, 126.1, 125.6, 125.3, 124.2 (d), 122.2, 55.3 (d), 21.6 (d).

$^{31}$P NMR (202 MHz, CDCl$_3$): δ 188.4 (s).

2-Fluoro-1,3-bis((R)-1-(naphthalene-1-yl)ethyl-1H-1,3,2-diazaphosphol-2(3H)-amine (a Precatalyst According to Formula II where X=F)

The following operations are conducted in a glovebox: Diazaphospholene bromide (compound of Formula IIa) (105 mg, 0.220 mmol, 1 equiv) was dissolved in 2 mL tetrahydrofuran. Silver (I) fluoride (84 mg, 0.663 mmol, 3 equiv) was added. The reaction was stirred in the dark for 16 hours. The resulting black reaction mixture was filtered and concentrated, to afford the title compound (71 mg, 0.171 mmol, 77%) as a brown foam.

$^1$H NMR (500 MHz, CDCl$_3$): δ 8.18-8.01 (m, 2H), 7.96-7.91 (m, 4H), 7.85-7.82 (m, 2H) 7.58-7.53 (m, 6H) 6.11-5.93 (m, 2H), 5.87-5.75 (m, 2H), 2.01 (d, J=6.8 Hz, 6H)

$^{13}$C NMR (125 MHz, CDCl$_3$): δ 138.5, 134.1, 131.0, 130.0, 129.7, 129.3, 129.2, 128.5, 127.4, 126.6, 125.8, 125.6, 123.9, 123.0, 122.7, 121.9, 53.3, 32.7, 23.2.

$^{31}$P NMR (201 MHz, CDCl$_3$): δ 114.7 (d, J=1094 Hz)

$^{19}$F NMR (270 MHz, CDCl$_3$): δ 31.1 (d, J=1094 Hz)

1,3-di[(R)-1-naphthylethyl]2,3-dihydro-1H-1,3,2-diazaphosphole-2-oxide (the Precatalyst of Formula (II-ia))

In a Schlenk flask under dry nitrogen, 3-bromo-1,3-di[(R)-1-naphthylethyl]2,3-dihydro-1H-1,3,2-diazaphosphole (the compound of Formula IIa) (500 mg, 1.05 mmol, 1 equiv) was dissolved in a solution of triethylamine (0.219 mL, 1.58 mmol, 1.5 equiv) in 10 mL dichloromethane. The remainder of the reaction was carried out in open air with no special precautions. Water (1 mL, 56 mmol, 53 equiv) was added, and the reaction was stirred for 2 minutes. The layers were separated, and the organic layer was dried over sodium sulfate. After filtration, and removal of volatiles in vacuo, the secondary phosphine oxide compound was obtained as a brown foam (405 mg, 1.01 mmol, 96% yield).

$^1$H NMR (500 MHz, CDCl$_3$) δ 8.14 (d, J=7.8 Hz, 1H), 8.01 (d, J=7.8 Hz, 1H), 7.95-7.89 (m, 2H), 7.86 (d, J=7.8 Hz, 1H), 7.81 (d, J=7.3 Hz, 1H), 7.71 (d, J=7.3 Hz, 1H), 7.63(d, J=7.85 Hz, 1H) 7.60 (d, J=4.1 Hz, 1H), 7.57-4.49 (m, 5H), 5.76 (ap. d, J=16.6 Hz), 5.61-5.51 (m, 2H), 3.11-3.04 (m, 1H), 1.97 (d, J=7.10 Hz, 3H), 1.87 (d, J=6.85 Hz, 3H)

{$^1$H}$^{31}$P NMR (202 MHz, CDCl$_3$) δ 6.68 ppm $^{31}$P NMR (202 MHz, CDCl$_3$) δ 6.68 ppm (d ap. sept. J=650.8, 11.8 Hz)

1,3-di[(R)-1-naphthylethyl]-2-(neopentyloxy)-2,3-dihydro-1H-1,3,2-diazaphosphole (the Precatalyst of Formula IIIa)

All operations in this procedure were conducted under an atmosphere of dry nitrogen. A solution of 2-Bromo-1,3-di[(R)-1-naphthylethyl]2,3-dihydro-1H-1,3,2-diazaphosphole (7.37 g, 15.5 mmol, 1 equiv) in 48 mL dry dichloromethane was prepared in a 500 mL Schlenk tube, equipped with a septum, stirbar, and sidearm. A positive pressure of nitrogen was attached to the sidearm. Triethylamine (2.37 mL, 17.0 mmol, 1.1 equiv) was added. Solid neopentyl alcohol (1.37 g, 15.5 mmol, 1 equiv) was added by brief removal of the septum under a countercurrent of nitrogen. The resulting solution was stirred at ambient temperature for 20 hours, then the solvent was removed in vacuo. The following operations were conducted in a glove box: the residue was taken up in 40 mL dry toluene, and filtered to remove triethylamine hydrobromide. The toluene was removed in vacuo to give a thick brown liquid which was triturated with 50 mL of pentane and filtered to yield 3.05 g of a tan solid. Concentration of the pentane to a minimal volume and refiltration yielded a further 2.40 g of product (5.45 g total, 11.3 mmol, 73% yield).

$^1$H NMR (300 MHz, CDCl$_3$): δ 8.35-8.26 (m, 1H), 8.13-8.06 (m, 1H), 7.95-7.84 (m, 2H), 7.82 (d, J=8.4 Hz,

1H), 7.72 (d, J=8.8 Hz, 1H), 7.67 (d, J=8.1 Hz, 1H), 7.61-7.53 (m, 2H), 7.54-7.43 (m, 3H), 7.28-7.20 (m, 1H), 7.09 (d, J=7.2 Hz, 1H), 5.86 (dd, J=2.7, 2.0 Hz, 1H), 5.75-5.63 (m, 1H), 5.58-5.49 (m, 1H), 5.56 (dd, J=2.3, 2.0 Hz, 1H), 3.01-2.91 (m, 2H), 1.92 (d, J=6.9 Hz, 3H), 1.89 (d, J=7.1 Hz, 3 H), 0.89 (s, 9H). $^1$H NMR shows inequivalence of the naphthylethyl groups and backbone protons.

$^{13}$C NMR (75 MHz, CDCl$_3$): δ 140.2, 140.1, 139.5, 139.4, 134.1, 134.0, 131.4, 130.9, 129.0, 128.3, 127.6, 126.3, 126.1, 125.6, 125.4, 125.3, 123.9, 123.8, 123.6, 123.0, 115.6 (d, J=9.5 Hz), 113.7 (d, J=8.9 Hz), 72.7 (d, J=4.5 Hz), 53.9 (d, J=20.5 Hz), 51.6 (d, J=27.9 Hz), 32.0, 26.8, 23.1 (d, J=17.0 Hz), 22.3 (d, J=4.64 Hz).

$^{31}$P NMR (121 MHz, CDCl$_3$): δ 97.8 (br. s.).

N,N-diethyl-1,3-bis((R)-1-(naphthalene-1-yl)ethyl-1H-1,3,2-diazaphosphol-2(3H)-amine (the Precatalyst of Formula IVa)

The following operations are conducted in a glovebox: Diazaphospholene bromide (compound of Formula IIa) (200 mg, 0.421 mmol, 1 equiv) was dissolved in 2 mL dichloromethane. Diethylamine (70 mg, 0.96 mmol, 2.3 equiv) was added. An immediate darkening of the tan solution to dark brown was observed. After 5 minutes, dichloromethane and excess diethylamine were removed in vacuo, and the residue was taken up in 10 mL ether, and filtered to remove diethylammonium hydrobromide. The filtrates were concentrated in vacuo, to afford the title compound (150 mg, 0.320 mmol, 76%) as a light green foam.

$^1$H NMR (500 MHz, CDCl$_3$): δ 8.35 (d, J=8.5 Hz, 1H), 8.20-8.18 (m, 1H), 7.92 (d, J=9.0 Hz, 1H), 7.89-7.86 (m, 1H), 7.82 (d, J=7.81 Hz, 1H), 7.75-7.28 (m, 1H), 7.65 (d, J=6.15 Hz, 1 H), 7.61 (t, J=6.8 Hz, 1 H), 7.56 (t, J=8.5 Hz, 1H), 7.52-7.47(m, 3H), 7.34-7.29 (m, 2H), 5.86 (s, 1H), 5.54-5.45 (m, 1H), 5.46 (s, 1H), 5.47-5.42 (m, 1H), 3.01-2.92 (m, 2H), 2.92-2.82 (m, 2H), 1.86 (d, J=6.7 Hz, 3H), 1.83 (d, J=6.7 Hz), 1.02 (ap. t, J=7.1 Hz, 6H).

$^{13}$C NMR (125 MHz, CDCl$_3$): δ 140.7, 140.6, 134.1, 134.1, 131.7, 131.2, 128.9, 128.9, 127.9, 127.5, 126.1, 125.9, 125.6, 125.5, 125.4, 125.3, 124.3, 124.2, 123.9, 123.7, 123.5, 113.8 (d, J=8.1 Hz), 112.9 (d, J=8.7 Hz), 53.9 (d, J=25.1 Hz), 51.6 (d, J=28.2 Hz), 39.6 (d, J=18.1 Hz), 22.3 (d, J=16.9 Hz), 15.1.

$^{31}$P NMR (201 MHz, CDCl$_3$): δ 95.9 (s).

Phosphenium triflate (a Compound According to Formula Va)

In a glovebox under an atmosphere of nitrogen, 3-Bromo-1,3-di[(R)-1-naphthylethyl]2,3-dihydro-1H-1,3,2-diazaphosphole (the compound of Formula IIa) (1.0 g, 2.1 mmol, 1 equiv) was dissolved in 6 mL dichloromethane in a vial which was wrapped to exclude light. Solid silver triflate (0.54 g, 2.1 mmol, 1 equiv) was added as a solid. After 24 hours, the resulting suspension was filtered over dry Celite, washing with dichloromethane until the washings were colourless. The volatiles were removed in vacuo to give a brown foam, which was triturated with pentane, and collected on a frit, to afford the compound according to Formula (Va) as a brown powder (1.02 grams, 1.87 mmol, 89% yield).

$^1$H NMR (500 MHz, CDCl$_3$) δ 8.12 (s, 2H), 7.91-7.82 (m, 6H), 7.53 (ap. t, J=7.3 Hz, 6H), 7.54-7.47 (m, 4H), 7.44 (ap. t, J=7.3 Hz, 2H), 6.54-6.47 (m, 2H), 2.06 (d, J=4.9 Hz, 6H) ppm.

$^{31}$P NMR (202 MHz, CDCl$_3$) δ 209.1 ppm.

$^{13}$C NMR (125 MHz, CDCl$_3$) δ 134.9, 134.0, 133.2 (d, $J^{PC}$=3.1 Hz), 131.0, 130.2, 129.3, 128.0, 126.7, 126.0 (q, $J^{CF}$=16.2 Hz) 125.3, 125.3, 121.8, 57.5 (d, $J^{PC}$=11.7), 23.0 (d, $J^{PC}$=8.0 Hz) ppm.

$^{19}$F NMR (270 MHz, CDCl$_3$) δ−78.2 ppm.

Phosphenium triflate (a Compound According to Formula Va)

In a glovebox under an atmosphere of nitrogen, 3-Bromo-1,3-di[(R)-1-naphthylethyl]2,3-dihydro-1H-1,3,2-diazaphosphole (the compound of Formula IIa) (2.0 g, 4.2 mmol, 1 equiv) was suspended in 15 mL acetonitrile in a 100 mL round bottom flask. TMS triflate (0.982 g, 4.42 mmol, 1.05 equiv) was added dropwise, resulting in the suspension becoming a clear solution. After 30 minutes, the volatiles were removed in vacuo. The resulting brown gum was dissolved in minimal dichloromethane, which was removed in vacuo to produce a brown foam. This was triturated with pentane, and collected on a frit to afford the compound according to Formula (Va) as a brown powder (2.21 grams, 4.06 mmol, 97% yield). The characterization data was equivalent to the data obtained for the compound prepared by the silver triflate procedure, discussed above.

Phosphenium triiodide (a Compound According to Formula VIII)

The following operations are conducted in a glovebox: (S,E)-N((E)-2-((S)-2,2-dimethyl-1-naphthalen-1-yl)propy-lamino)ethylidene)-2,2-dimethyl-1-(naphthalene-1-yl)-propan-1-amine (0.533 g, 1.19 mmol, 1 equiv) was dissolved in dichloromethane (5 mL). Phosphorus triiodide (0.489 g, 1.19 mmol, 1 equiv) was added to the solution and the resulting mixture was left to stir for 16 h. The solvent was removed in vacuo, and washed with pentane to afford the product as a brown solid (0.92 g, 90%).

$^1$H NMR (500 MHz, CD$_3$CN): δ 8.44 (s, 2H), 8.37 (m, 2H), 7.96-7.88 (m, 6H), 7.73 (m, 2H), 7.62-7.58 (m, 4H), 6.53 (d, J=10.3 Hz, 2H), 1.29 (s, 18H).

$^{13}$C NMR (125 MHz, CD$_3$CN): δ 136.0, 134.2, 132.5, 131.5, 130.7, 129.5, 128.3, 126.8, 124.8, 122.6, 37.2, 28.3.

$^{31}$P NMR (201 MHz, CD$_3$CN): δ 210.8 (s).

HRMS (APCI): 479.2598, [C$_{32}$H$_{36}$N$_2$P]$^+$ requires 479.2611.

1,3-bis((S)-2,2-dimethyl-1-(naphthalene-1-yl)pro-pyl)-2-iodo-2,3dihydro-1H-1,3,2-diazaphosphole (a precatalyst according to Formula II where X=I)

The following operations are conducted in a glovebox: Phosphenium triiodide (0.500 g, 0.58 mmol, 1 equiv) was dissolved in ether (4 mL). Lithium hydride (0.023 g, 2.91 mmol, 5 equiv) was added to the solution and the resulting suspension was allowed to stir for 16 h over which time a disappearance in colour was observed. The resulting mixture was filtered over celite, which was washed with ether, and then the solvent was removed from the filtrate in vacuo to afford the product as a brown solid (0.150 g, 57%).

$^1$H NMR (500 MHz, CD$_3$CN): δ 8.52-8.50 (m, 2H), 8.19 (s, 2H), 8.01-7.98 (m, 5H), 7.65-7.59 (m, 5H), 6.53 (d, J=10.9 Hz, 2H), 5.48 (s, 2H), 1.18 (s, 18H).

$^{13}$C NMR (125 MHz, CD$_3$CN): δ 134.0, 133.9, 133.4, 131.8, 129.9, 129.2, 127.1, 127.1, 126.3, 124.9, 65.3, 54.3, 36.8, 14.6.

$^{31}$P NMR (201 MHz, CD$_3$CN): δ 211.4 (s).

HRMS (APCI): 479.2611, [C$_{32}$H$_{36}$N$_2$P]$^+$ requires 479.2611.

Imine Reduction of N-(2,3-dihydroinden-1-ylidene) prop-2-yn-1-amine using the Pre-Catalyst of Formula (IIIa)

The following is representative of the general procedure for reducing an imine.

The following procedure is conducted under nitrogen: N-(2,3-dihydroinden-1-ylidene)prop-2-yn-1-amine (200 mg, 1.18 mmol, 1 equiv) was dissolved in THF (1 mL) and stirred. The pre-catalyst of Formula (IIIa) (11 mg, 0.023 mmol, 0.02 equiv) and pinacol borane (0.17 mL, 1.18 mmol, 1 equiv) were added and the resulting mixture was stirred for 12 h. The following part of the procedure is conducted under ambient atmosphere: the solvent was removed in vacuo. The residue was treated with concentrated sulfuric acid, taken up in 10 mL water, and washed with diethyl ether (2×10 mL). The aqueous layer was made basic with 2N NaOH, extracted with diethyl ether (2×10 mL). The combined organic layers were dried over $Na_2SO_4$, and solvent was removed in vacuo. The resulting residue was purified by chromatography on basic Brockman Grade I alumina (10% EtOAc/hexanes, followed by diethyl ether) to afford the product (170 mg, 84%).

$^1$H NMR (500 MHz, $CDCl_3$): δ 7.39-7.38 (m, 1H), 7.30-23 (m, 3H), 4.46 (t, 1H, J=5.8), 3.61-3.52 (m, 2H), 3.11-3.05 (m, 1H), 2.90-2.84 (m, 1H), 2.47-2.41 (m, 1H), 2.30 (t, 1H, J=2.4), 1.93-1.88 (m, 1H), 1.56 (broad s, 1H).

$^{13}$C (125 MHz, $CDCl_3$): δ 144.5, 143.8, 127.7, 126.3, 124.9, 124.2, 82.5, 71.4, 61.9, 36.2, 33.4, 30.5.

The enantiomeric excess was determined by HPLC on an Astec® Cellulose DMP column (2.5 cm×4.6 mm) with 99:1 hexanes to 2-propanol at a flowrate of 0.5 mL/minute, $t_{major}$=25.091 min, $t_{min}$=27.244 min. Enantiomeric ratio=85:15.

Imine Reduction of 5-naphthalen-2-yl-3,4-dihydro-2H-pyrrole using the Catalyst of Formula (Va)

The following is representative of the general procedure for reducing an imine using a phosphenium catalyst according to the present disclosure.

Under an atmosphere of nitrogen, the substrate (1 equiv) is placed in a vial. The catalyst having a formula according to Formula (Va) (0.05 equiv) is added as a solid. Tetrahydrofuran (THF) is added to make the final concentration 0.3 M in substrate. The vial is cooled to −30° C. in a freezer for 30 minutes. The reductant is added, and the reaction is maintained at −30° C. for 4 to 6 hours. In the case of pinacolborane, the reductant is pre-chilled to −30° C., and added as a neat liquid. In the case of catecholborane, which freezes at 12° C., the catecholborane is added as a pre-chilled 1M solution in THF. Different amounts of the catalyst, such as from 0.5 to 5 mol %, may be used. Alternative solvents, such as acetonitrile, dichloromethane, diethyl ether, tetrahydrofuran, toluene, or trifluorotoluene, may be used instead of THF.

In the preceding description, for purposes of explanation, numerous details are set forth in order to provide a thorough understanding of the examples. However, it will be apparent to one skilled in the art that these specific details are not required. Accordingly, what has been described is merely illustrative of the application of the described examples and numerous modifications and variations are possible in light of the above teachings.

Since the above description provides examples, it will be appreciated that modifications and variations can be effected to the particular examples by those of skill in the art. Accordingly, the scope of the claims should not be limited by the particular examples set forth herein, but should be construed in a manner consistent with the specification as a whole.

Table 2

What is claimed is:

1. A compound:
(a) having a chemical formula according to Formula (I);
(b) having a chemical formula that is the enantiomer of Formula (I);
(c) that is reactive with a hydride to produce a compound having a chemical formula according to Formula (I); or
(d) that is reactive with a hydride to produce a compound having a chemical formula that is the enantiomer of Formula (I);

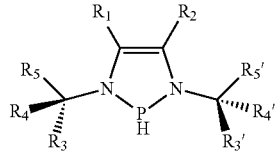

Formula (I)

wherein:
$R_1$ and $R_2$ are H, optionally substituted $C_1$-$C_3$ alkyl, or linked together to form an optionally substituted $C_3$ or $C_4$ alkyl group;
$R_3$ and $R_3$' are H;
$R_4$ and $R_4$' are the same, and are optionally substituted $C_1$-$C_6$ alkyl; and
$R_5$ and $R_5$' are the same, and are optionally substituted aryl or heteroaryl;
and optionally wherein: $R_4$ and $R_5$ are linked, $R_4$' and $R_5$' are linked, and both linking groups are the same.

2. The compound according to claim 1, wherein the optionally substituted $C_1$-$C_6$ alkyl is linear, includes a secondary carbon atom, or includes a tertiary carbon atom.

3. The compound according to claim 1, wherein the optionally substituted $C_1$-$C_6$ alkyl is substituted with a silyl ether; or substituted with an alkyl ether.

4. The compound according to claim 1, wherein $R_4$ and $R_4$' are methyl, trifluoromethyl, ethyl, propyl, isopropyl or tert-butyl.

5. The compound according to claim 1, wherein the optionally substituted aryl is optionally substituted: phenyl, naphthyl, anthracene, phenanthrene, or pyrene.

6. The compound according to claim 1, wherein the optionally substituted aryl is naphthyl linked at the 1-position or the 2-position.

7. The compound according to claim 1, wherein the optionally substituted aryl is optionally substituted phenyl, and $R^4$ and $R^{4'}$ are linked to the phenyl ring.

8. The compound according to claim 1, wherein the optionally substituted heteroaryl is optionally substituted: quinoline, isoquinoline, benzofuran, or benzothiophene.

9. The compound according to claim 1, wherein the optionally substituted aryl or heteroaryl is substituted with trifluoromethyl.

10. The compound according to claim 1, wherein the chemical formula according to Formula (I) is a chemical formula according to Formula (Ia), (Ib), (Ic), or (Id):

Formula (Ia)

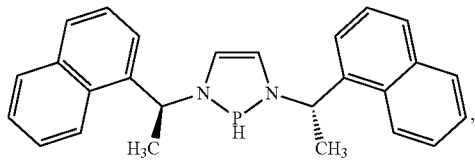

Formula (Ib)

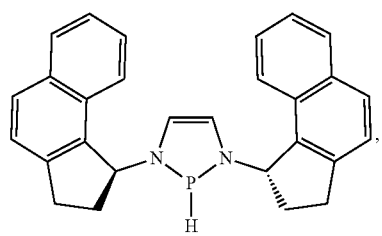

Formula (Ic)

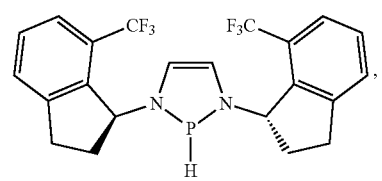

Formula (Id)

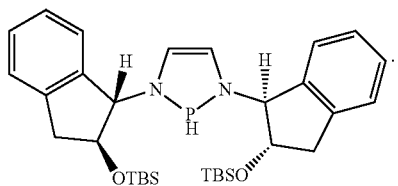

11. The compound according to claim 1, wherein the compound is a compound that is reactive with a hydride to produce a compound having a chemical formula according to Formula (I) or the enantiomer of Formula (I), and the compound has a chemical formula according to Formula (II), or has a chemical formula that is the enantiomer of Formula (II):

Formula (II)

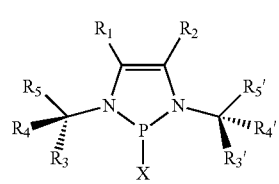

wherein:
X is halogen.

12. The compound according to claim 11, wherein the compound that is reactive with a hydride has a chemical formula according to Formula (IIa), or has a chemical formula that is the enantiomer of Formula (IIa):

Formula (IIa)

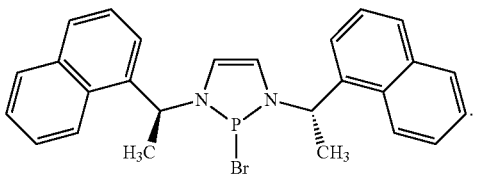

13. The compound according to claim 1, wherein the compound is a compound that is reactive with a hydride to produce a compound having a chemical formula according to Formula (I) or the enantiomer of Formula (I), and the compound has a chemical formula according to Formula (II-i), or has a chemical formula that is the enantiomer of Formula (II-i):

Formula (II-i)

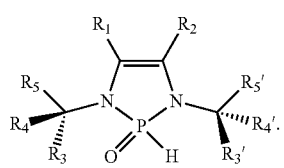

14. The compound according to claim 13, wherein the compound that is reactive with a hydride has a chemical formula according to Formula (II-ia), or has a chemical formula that is the enantiomer of Formula (II-ia):

Formula (II-ia)

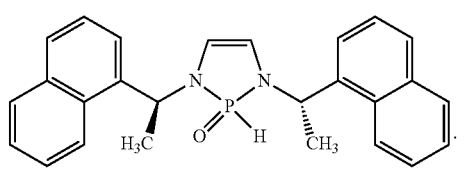

15. The compound according to claim 1, wherein the compound is a compound that is reactive with a hydride to produce a compound having a chemical formula according to Formula (I) or the enantiomer of Formula (I), and the compound has a chemical formula according to Formula (III), or has a chemical formula that is the enantiomer of Formula (III):

Formula (III)

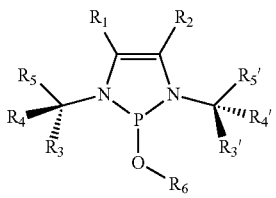

wherein:
$R_6$ is: optionally substituted alkyl, aryl, or heteroaryl.

16. The compound according to claim 15, wherein the compound that is reactive with a hydride has a chemical formula according to Formula (IIIa), or has a chemical formula that is the enantiomer of Formula (IIIa):

Formula (IIIa)

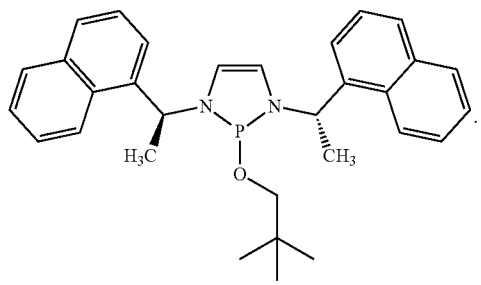

17. The compound according to claim 1, wherein the compound is a compound that is reactive with a hydride to produce a compound having a chemical formula according to Formula (I) or the enantiomer of Formula (I), and the compound has a chemical formula according to Formula (IV), or has a chemical formula that is the enantiomer of Formula (IV):

Formula (IV)

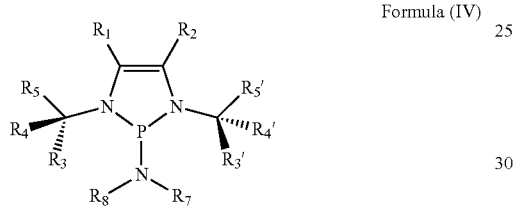

wherein:
$R_7$ and $R_8$ are, independently: optionally substituted alkyl, aryl, or heteroaryl;
and optionally wherein $R_7$ and $R_8$ are linked.

18. The compound according to claim 17, wherein the compound that is reactive with a hydride, has a chemical formula according to Formula (IVa) or Formula (IVb), or has a chemical formula that is the enantiomer of Formula (IVa) or Formula (IVb):

Formula (IVa)

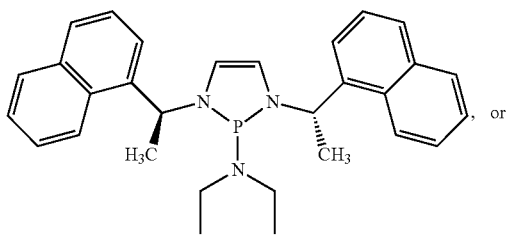

, or

Formula (IVb)

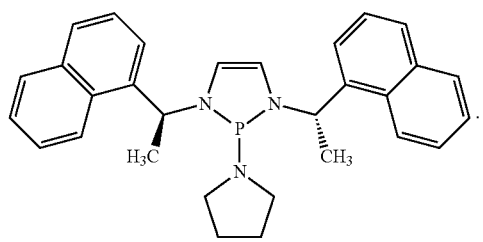

19. A compound:
(a) having a chemical formula according to Formula (V); or
(b) having a chemical formula that is the enantiomer of Formula (V);

Formula (V)

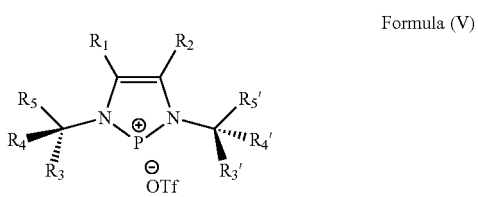

wherein:
$R_1$ and $R_2$ are H, optionally substituted $C_1$-$C_3$ alkyl, or linked together to form an optionally substituted $C_3$ or $C_4$ alkyl group;
$R_3$ and $R_3'$ are H;
$R_4$ and $R_4'$ are the same, and are optionally substituted $C_1$-$C_6$ alkyl; and
$R_5$ and $R_5'$ are the same, and are optionally substituted aryl or heteroaryl;
and optionally wherein: $R_4$ and $R_5$ are linked, $R_4'$ and $R_5'$ are linked, and both linking groups are the same.

20. The compound according to claim 19, wherein the chemical formula according to Formula (V) is a chemical formula according to Formula (Va):

Formula (Va)

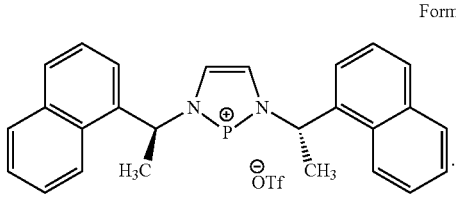

* * * * *